(12) United States Patent
Wang et al.

(10) Patent No.: US 7,351,444 B2
(45) Date of Patent: Apr. 1, 2008

(54) LOW PLATINUM FUEL CELL CATALYSTS AND METHOD FOR PREPARING THE SAME

(75) Inventors: Ning Wang, Martinez, CA (US); Yi Dong, Tracy, CA (US); Yi-Qun Li, Walnut Creek, CA (US)

(73) Assignee: Intematix Corporation, Fremont, CA (US)

( * ) Notice: Subject to any disclaimer, the term of this patent is extended or adjusted under 35 U.S.C. 154(b) by 67 days.

(21) Appl. No.: 10/823,088

(22) Filed: Apr. 12, 2004

(65) Prior Publication Data

US 2005/0053826 A1    Mar. 10, 2005

Related U.S. Application Data

(60) Provisional application No. 60/549,712, filed on Mar. 2, 2004, provisional application No. 60/501,158, filed on Sep. 8, 2003.

(51) Int. Cl.
*H01M 4/96* (2006.01)
*H01M 4/92* (2006.01)
*H01M 8/10* (2006.01)
*B05D 5/12* (2006.01)
*B01J 21/18* (2006.01)

(52) U.S. Cl. .................... 427/115; 502/101; 429/44
(58) Field of Classification Search ........... 427/115; 502/101; 429/44
See application file for complete search history.

(56) References Cited

U.S. PATENT DOCUMENTS

| | | | |
|---|---|---|---|
| 4,031,291 A | 6/1977 | Fullenwider | |
| 4,202,934 A | 5/1980 | Jalan | |
| 4,316,944 A | 2/1982 | Landsman et al. | |
| 4,395,322 A * | 7/1983 | Harris | 204/290.08 |
| 4,447,506 A | 5/1984 | Luczak et al. | |
| 4,711,829 A | 12/1987 | Luczak et al. | |
| 4,716,087 A | 12/1987 | Ito et al. | |
| 4,794,054 A | 12/1988 | Ito et al. | |
| 4,812,352 A | 3/1989 | Debe | |
| 4,880,711 A | 11/1989 | Luczak et al. | |
| 4,916,110 A | 4/1990 | Manniso | |
| 5,024,905 A | 6/1991 | Itoh et al. | |
| 5,039,561 A | 8/1991 | Debe | |
| 5,079,107 A | 1/1992 | Jalan | |
| 5,176,786 A | 1/1993 | Debe | |
| 5,183,713 A | 2/1993 | Kunz | |
| 5,225,391 A | 7/1993 | Stonehart et al. | |

(Continued)

OTHER PUBLICATIONS

Bekyarova, et al. (2002) Oxidation and Porosity Evaluation of Budlike Single-Wall Carbon Nanohorn Aggregates. *American Chemical Society*, 18(10): 4138-4141.

(Continued)

*Primary Examiner*—Gregg Cantelmo
(74) *Attorney, Agent, or Firm*—Quine Intellectual Property Law Group, P.C.; Gary Baker

(57) ABSTRACT

This invention provides novel fuel cell catalysts comprising new series of catalytically active thin-film metal alloys with low platinum concentration supported on nanostructured materials (nanoparticles). In certain embodiments, an integrated gas-diffusion/electrode/catalyst layer can be prepared by processing catalyst thin films and nanoparticales into gas-diffusion media such as Toray or SGL carbon fiber papers. The catalysts can be placed in contact with an electrolyte membrane for PEM fuel cell applications.

19 Claims, 18 Drawing Sheets

U.S. PATENT DOCUMENTS

| | | | |
|---|---|---|---|
| 5,238,729 | A | 8/1993 | Debe |
| 5,336,558 | A | 8/1994 | Debe |
| 5,338,430 | A | 8/1994 | Parsonage et al. |
| 5,653,951 | A | 8/1997 | Rodriguez et al. |
| 5,856,036 | A | 1/1999 | Smotkin et al. |
| 5,879,827 | A | 3/1999 | Debe et al. |
| 5,997,832 | A * | 12/1999 | Lieber et al. ............... 423/249 |
| 6,007,934 | A | 12/1999 | Auer et al. |
| 6,015,635 | A | 1/2000 | Kawahara |
| 6,040,077 | A | 3/2000 | Debe et al. |
| 6,159,538 | A | 12/2000 | Rodriguez et al. |
| 6,287,717 | B1 | 9/2001 | Cavalca et al. |
| 6,300,000 | B1 | 10/2001 | Cavalca et al. |
| 6,333,016 | B1 | 12/2001 | Resasco et al. |
| 6,339,038 | B1 | 1/2002 | Tada et al. |
| 6,451,175 | B1 | 9/2002 | Lal |
| 6,454,816 | B1 | 9/2002 | Lee et al. |
| 6,458,478 | B1 | 10/2002 | Wang et al. |
| 6,471,936 | B1 | 10/2002 | Chen et al. |
| 6,485,858 | B1 | 11/2002 | Baker et al. |
| 6,517,965 | B1 | 2/2003 | Gorer |
| 6,531,704 | B2 | 3/2003 | Yadav et al. |
| 6,562,499 | B1 | 5/2003 | Naka et al. |
| 6,572,997 | B1 | 6/2003 | Iqbal et al. |
| 6,589,312 | B1 | 7/2003 | Snow et al. |
| 6,589,682 | B1 | 7/2003 | Flecker et al. |
| 6,591,617 | B2 | 7/2003 | Wolfe |
| 6,627,689 | B2 | 9/2003 | Iino et al. |
| 6,645,628 | B2 | 11/2003 | Shiffler, Jr. et al. |
| 6,654,229 | B2 | 11/2003 | Yanagisawa et al. |
| 6,660,680 | B1 | 12/2003 | Hampden-Smith et al. |
| 6,667,099 | B1 | 12/2003 | Greiner et al. |
| 6,672,077 | B1 | 1/2004 | Bradley et al. |
| 6,679,280 | B1 | 1/2004 | Pinto |
| 6,683,783 | B1 | 1/2004 | Smalley et al. |
| 6,689,439 | B2 | 2/2004 | Sobolewski |
| 6,689,711 | B2 | 2/2004 | Lefebvre |
| 6,706,431 | B2 | 3/2004 | Kawamura et al. |
| 6,709,471 | B2 | 3/2004 | Miyamoto |
| 6,709,560 | B2 | 3/2004 | Andelman et al. |
| 6,712,864 | B2 | 3/2004 | Horiuchi et al. |
| 6,713,519 | B2 | 3/2004 | Wang et al. |
| 6,731,022 | B2 | 5/2004 | Silverman |
| 6,733,828 | B2 | 5/2004 | Chao et al. |
| 6,746,790 | B2 | 6/2004 | Colborn |
| 6,749,827 | B2 | 6/2004 | Smalley et al. |
| 6,753,108 | B1 | 6/2004 | Hampden-Smith et al. |
| 6,764,785 | B2 | 7/2004 | Colborn et al. |
| 6,780,388 | B2 | 8/2004 | Masuko et al. |
| 6,781,817 | B2 | 8/2004 | Andelman |
| 6,821,663 | B2 | 11/2004 | McElroy et al. |
| 6,824,912 | B2 | 11/2004 | Yamaura et al. |
| 6,846,345 | B1 | 1/2005 | Keller et al. |
| 6,854,688 | B2 | 2/2005 | McElroy et al. |
| 6,863,942 | B2 | 3/2005 | Ren et al. |
| 6,869,583 | B2 | 3/2005 | Harutyuyan et al. |
| 6,869,721 | B2 | 3/2005 | Imazato |
| 6,872,330 | B2 | 3/2005 | Mack et al. |
| 6,884,405 | B2 | 4/2005 | Ryzhkov |
| 6,984,579 | B2 * | 1/2006 | Nguyen et al. ............... 438/622 |
| 2003/0124717 | A1 * | 7/2003 | Awano et al. ............ 435/287.2 |
| 2004/0167014 | A1 | 8/2004 | Yan et al. |

OTHER PUBLICATIONS

Che et al. (1998) Carbon Nanotubule Membranes For Electrochemical Energy Storage And Production, *Nature*, 393: 346-349.

Chu and Jiang (2002) "Novel electrocatalysts for direct methanol fuel cells." *Solid State Ionics*, 148(3-4): 591-599.

Haug et al. (2002) "Development of a Novel CO Tolerant Proton Exchange Membrane Fuel Cell Anode." *Journal of The Electrochemical Society*, 149 (7) A862-A867.

* cited by examiner

| On Carbon Fiber Paper | On CNT of Co(200Å) | On CNT of Ni(200Å) |
| --- | --- | --- |
| (1) | (2) | (3) |

LOW PLATINUM FUEL CELL CATALYSTS AND METHOD FOR PREPARING THE SAME

CROSS-REFERENCE TO RELATED APPLICATIONS

This application is related to provisional applications U.S. Ser. No. 60/549,712, filed on Mar. 2, 2004, and U.S. Ser. No. 60/501,158, filed on Sep. 8, 2003.

STATEMENT AS TO RIGHTS TO INVENTIONS MADE UNDER FEDERALLY SPONSORED RESEARCH AND DEVELOPMENT

[Not Applicable]

FIELD OF THE INVENTION

This invention is in the field of electrochemical catalysts used in fuel cells (e.g., in polymer electrolyte membrane (PEM) fuel cells). The invention is related to the reduction of the platinum contents and the improvement of the catalytic efficiency by innovative catalyst compositions and nanostructures at the interfaces, or inside a gas micro distribution (microdiffusion) layer, between the electrodes and the polymer electrolyte (PEM) comprising the fuel cell.

BACKGROUND OF THE INVENTION

Fuel cells combine hydrogen and oxygen without combustion to form water and to produce direct current electric power. The process can be described as electrolysis in reverse. Fuel cells have potential for stationary and portable power applications; however, the commercial viability of fuel cells for power generation in stationary and portable applications depends upon solving a number of manufacturing, cost, and durability problems.

Electrochemical fuel cells convert fuel and an oxidant to electricity and a reaction product. A typical fuel cell consists of a membrane and two electrodes, called a cathode and an anode. The membrane is sandwiched between the cathode and anode. Fuel, in the form of hydrogen, is supplied to the anode, where a catalyst, such as platinum and its alloys, catalyzes the following reaction: $2H_2 \rightarrow 4H^+ + 4e^-$.

At the anode, hydrogen separates into hydrogen ions (protons) and electrons. The protons migrate from the anode through the membrane to the cathode. The electrons migrate from the anode through an external circuit in the form of electricity. An oxidant, in the form of oxygen or oxygen containing air, is supplied to the cathode, where it reacts with the hydrogen ions that have crossed the membrane and with the electrons from the external circuit to form liquid water as the reaction product. The reaction is typically catalyzed by the platinum metal family. The reaction at the cathode occurs as follows: $O_2 + 4H^+ + 4e^- \rightarrow 2H_2O$.

The successful conversion of chemical energy into electrical energy in a primitive fuel cell was first demonstrated over 160 years ago. However, in spite of the attractive system efficiencies and environmental benefits associated with fuel-cell technology, it has proven difficult to develop the early scientific experiments into commercially viable industrial products. Problems have often been associated with lack of appropriate materials that would enable the cost and efficiency of electricity production to compete with existing power technology.

Polymer electrolyte fuel cells have improved significantly in the past few years both with respect to efficiency and with respect to practical fuel cell design. Some prototypes of fuel-cell replacements for portable batteries and for automobile batteries have been demonstrated. However, problems associated with the cost, activity, and stability of the electrocatalyst are major concerns in the development of the polymer electrolyte fuel cell. For example, platinum (Pt)-based catalysts are the most successful catalysts for fuel cell and other catalytic applications. Unfortunately, the high cost and scarcity of platinum has limited the use of this material in large-scale applications.

In addition poisoning at the anode by carbon monoxide has been a problematic with the use of platinum. On the cathode side, usually more higher catalyst levels have been desired because methanol and other carbon containing fuel passing through the membrane react with oxygen on the cathode under catalytic effect of platinum thereby decreasing the efficiency of the full cell.

To improve the catalytic efficiency and reduce the cost, other noble metals and non-noble metals are used to form Pt alloy as catalysts. The noble metals include Pd, Rh, Ir, Ru, Os, Au, etc have been investigated. The non-noble metals including Sn, W, Cr, Mn, Fe, Co, Ni, Cu, etc (U.S. Pat. No. 6,562,499) has also been tried. Different Pt-alloys were disclosed as catalysts for fuel cell application. Binary Alloys as catalysts include Pt—Cr (U.S. Pat. No. 4,316,944), Pt—V (U.S. Pat. No. 4,202,934), Pt—Ta (U.S. Pat. No. 5,183,713), Pt—Cu (U.S. Pat. No. 4,716,087), Pt—Ru (U.S. Pat. No. 6,007,934), Pt—Y (U.S. Pat. No. 4,031,291) etc. Ternary alloys as catalysts include Pt—Ru—Os (U.S. Pat. 5,856,036), Pt—Ni—Co, Pt—Cr—C, Pt—Cr—Ce (U.S. Pat. No. 5,079,107), Pt—Co—Cr (U.S. Pat. No. 4,711,829), Pt—Fe—Co (U.S. Pat. No. 4,794,054), Pt—Ru—Ni (U.S. Pat. No. 6,517,965), Pt—Ga—Cr, Co, Ni (U.S. Pat. No. 4,880,711), Pt—Co—Cr (U.S. Pat. No. 4,447,506), etc. Quaternary Alloys as catalysts includes Pt—Ni—Co—Mn (U.S. Pat. No. 5,225,391), Pt—Fe—Co—Cu (U.S. Pat. No. 5,024,905), etc. On anode side, Ru plays an important role to reduce the poison problem (Journal of The Electrochemical Society, (149 (7) A862-A867, 2002) (U.S. Pat. No. 6,339,038). Ru has the ability to form OHads from water. This allows the catalytic desorption of CO as $CO_2$. On the cathode side, non-noble metal complex catalysts, such as Fe,Co, Ni porphyrins have been utilized (*Solid State Ionics* 148 (2002) 591-599).

In the design of electrodes, a three-phase boundary of reaction gases ($H_2$ and $O_2$), catalysts and conductors (for proton and electron) is commonly required for the electrochemical reaction. An extensively used approach to fuel cell fabrication is the so-called "ink" coating method. In this method, catalyst particles (e.g., 2-4 nm) are supported on carbon particles (15 nm of Vulcan XC72). These particles are mixed with a solution of polymer electrolyte as an ink, which is smeared on the surface of a conductor, such as carbon paper, to form a three-phase coating. In this approach, an electrolyte film covers the mixed particles of catalyst and carbon. Therefore, no direct three-phase boundary exists in this structure. Reaction gases, $H_2$ and $O_2$ do not directly contact the catalyst, but rather, must diffuse through the electrolyte layer to reach the catalyst surface. On the cathode side, protons must diffuse through the electrolyte layer to reach $O_2$-ions. Therefore, there exists two opposite requirements: Protons need a thick electrolyte layer to maintain good conductivity. On the other hand, a thick electrolyte layer forms a diffusion barrier for $O_2$. To solve this difficulty, some improvements have been suggested for the "ink" coating design. Toyota company (in U.S. Pat. No. 6,015,635) suggested the use of pure electrolyte clusters inserted into the "ink" coating layer to increase proton conductivity. In U.S. Pat. No. 6,309,772), it is suggested that electrolyte coated and un-coated carbon-catalyst particles are mixed to form the "ink" layer to improve gas diffusion. In these "ink" coating structure, the efficiency of the catalysts are still restricted by gas and proton diffusion.

More recently some new catalyst structures were used to increase the catalytic efficiency. For example, 3M Company (U.S. Pat. Nos. 5,879,827 and 6,040,077) used a nanostructure electrode. In this structure, an acicular nano polymer whisker supports deposited acicular nanoscopic catalytic particles. At first, an organic material is deposited on a substrate. Then the deposited layer is annealed in vacuum, and forms a dense array of acicular nano polymer whiskers. The preferred length of the whiskers is equal or less than 1 micrometer. Then, catalyst thin film is deposited on the supporting whiskers. The diameter of catalyst particle is less than 10 nm, and the length is less than 50 nm. In a Pt and Ru loading range of 0.09-0.425 mg/cm2, the fuel cell obtained a satisfactory catalytic efficiency. However the process is complicated by non-electrical conducting nano polymer whiskers and transferring the catalyst coated polymer whisker layers onto carbon electrodes. Pt mixed carbon inks are still used under the whisker layer in this design.

Gore Enterprise Holdings (U.S. Pat. Nos. 6,287,717 and 6,300,000) used a direct catalyst thin film coating on carbon electrodes or on Pt mixed carbon ink layers. The catalyst thin film played an important role as an interface layer which could have a different platinum concentration than the rest of catalyst layers. This structure effectively reduced the platinum contents of the catalyst used in the fuel cells. A catalyst loading less than 0.1 mg/cm2 was claimed.

SUMMARY OF THE INVENTION

The invention provides novel fuel cell catalysts comprising new series of thin-film metal alloy catalysts with low platinum concentration supported on nanostructured materials (nanoparticles). In certain embodiments, the integrated gas-diffusion/electrode/catalysts layer can be prepared by processing catalyst thin films and nanoparticales into gas-diffusion media such as Toray or SGL carbon fiber papers. The catalysts can be placed in contact with an electrolyte membrane for PEM fuel cell applications.

Thus, in one embodiment this invention provides a composition comprising a plurality of carbon fibers bearing nanoparticles (e.g., nanotubes, nanofibers, nanohorns, nanopowders, nanospheres, quantum dots, etc.). The plurality of carbon fibers can comprise a porous electrode and/or a carbon paper. In certain embodiments, the nanoparticles comprise carbon nanotubes and the nanotubes are seeded with one or more nanotube growth catalysts selected from the group consisting of $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$. Particularly preferred nanotube growth catalysts include, but are not limited to, and $Co_{0.88}Mo_{0.12}$, $Co_{0.22}Ni_{0.56}Mo_{0.22}$, $Co_{0.57}Ni_{0.21}V_{0.11}Cr_{0.11}$, $Ni_{0.8}Mo_{0.1}Al_{0.1}$, and $Co_{0.64}Ni_{0.24}Al_{0.12}$. In various embodiments, the nanoparticles are nanotubes having a length less than 50 μm and/or a width/diameter less than about 100 nm or less than about 50 nm. The nanoparticles are typically coated with a substantially continuous thin film, preferably a catalytically active thin film, e.g., a film comprising platinum or a platinum alloy. The thin film can partially or completely cover the nanoparticles and, in certain embodiments, ranges in thickness from about 1 to about 1000 angstroms, more typically from about 5 to about 100 or 500 angstroms.

In certain embodiments, the thin film comprises an alloy comprising platinum (Pt), vanadium (V), and one or more metals selected from the group consisting of Co, Ni, Mo, Ta, W, and Zr, more typically selected from the group consisting of Co, and Ni. In certain embodiments, platinum comprises up to about 12%, 25%, or 50% (mole ratio or atomic percentage) of the alloy. In certain embodiments, the alloy contains platinum, vanadium, nickel, and copper. In certain embodiments, the thin film comprises an alloy having the formula: $Pt_xV_yCo_zNi_w$, where x is greater than 0.06 and less than 1; y, z, and w are independently greater than zero and less than 1; and x+y+z+w=1. In certain embodiments, x is 0.12. In certain embodiments, x is 0.12, y is 0.07, z is 0.56, and w is 0.25.

Also provided is a fuel cell catalyst comprising a plurality of nanoparticles where the nanoparticles are coated with a substantially continuous catalytically active thin film, e.g., a thin film comprising platinum or a platinum alloy. In certain embodiments, the nanoparticles are nanotubes. The nanotubes can be seeded with one or more nanotube growth catalysts selected from the group consisting of $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$. Particularly preferred nanotube growth catalysts include, but are not limited to $Co_{0.88}Mo_{0.12}$, $Co_{0.22}Ni_{0.56}Mo_{0.22}$, $Co_{0.57}Ni_{0.21}V_{0.11}Cr_{0.11}$, $Ni_{0.8}Mo_{0.1}Al_{0.1}$, and $Co_{0.64}Ni_{0.24}Al_{0.12}$. In various embodiments, the nanotubes have a length less than 50 μm and/or a width/diameter less than about 100 nm or less than about 50 nm. The thin film can partially or completely cover the nanoparticles and, in certain embodiments, ranges in thickness from about 1 to about 1000 angstroms, more typically from about 5 to about 100 or 500 angstroms.

In certain embodiments, the thin film comprises an alloy comprising platinum (Pt), vanadium (V), and one or more metals selected from the group consisting of Co, Ni, Mo, Ta, W, and Zr, more typically selected from the group consisting of Co, and Ni. In certain embodiments, platinum comprises up to about 12%, 25%, or 50% (mole ratio or atomic percentage) of the alloy. In certain embodiments, the alloy contains platinum, vanadium, nickel, and copper. In certain embodiments, the thin film comprises an alloy having the formula: $Pt_xV_yCo_zNi_w$, where x is greater than 0.06 and less than 1; y, z, and w are independently greater than zero and less than 1; and x+y+z+w=1. In certain embodiments, x is 0.12. In certain embodiments, x is 0.12, y is 0.07, z is 0.56, and w is 0.25. In certain embodiments, the nanoparticles are attached, or incorporated into, a substrate (e.g., a porous carbon substrate, a polymer substrate, carbon paper, etc.). The nanoparticles can be electrically coupled to an electrode. In certain embodiments, the nanoparticles are selected from the group consisting of nanotubes, nanofibers, nanohorns, nanopowders, nanospheres, and quantum dots. In certain embodiments, the nanoparticles are carbon nanotubes seeded with one or more catalysts selected from the group consisting of $Co_{1-x}Mo_x$ where $\leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$. In certain embodiments, the nanoparticles are carbon nanotubes seeded with one or more catalysts selected from the group consisting of $Co_{0.88}Mo_{0.12}$, $Co_{0.22}Ni_{0.56}Mo_{0.22}$, $Co_{0.57}Ni_{0.21}V_{0.11}Cr_{0.11}$, $Ni_{0.8}Mo_{0.1}Al_{0.1}$, and $Co_{0.64}Ni_{0.24}Al_{0.12}$. In certain embodiments, the nanoparticles are nanotubes having a length less than about 200 μm and a width less than about 100 nm. In certain embodiments, the nanoparticles are nanotubes having a diameter of about 10 nm to about 100 nm.

In still another embodiment, this invention provides an electrode-membrane combination comprising: at least a first conductive electrode comprising a first fuel cell catalyst; at least a second conductive electrode comprising a second fuel cell catalyst; and a proton exchange membrane separating the first conductive electrode and the second conductive electrode; where the first fuel cell catalyst and the second fuel cell catalyst are independently selected catalysts as described herein (e.g. a plurality of nanoparticles where the nanoparticles are coated with a substantially continuous catalytically active thin film, e.g., a thin film comprising platinum or a platinum alloy). The first fuel cell catalyst and the second fuel cell catalyst can comprise the same or different nanoparticles and/or the same or different catalytically active thin films. In certain embodiments, the proton exchange membrane has a thickness ranging from about 2 μm to about 100 μm. Suitable proton exchange membranes include, but are not limited to Nafion, silicon oxide Nafion composite, polyphosphazenes, sulfonated (PPO), silica-polymer composites, and the like. In certain embodiments, the first conductive electrode and the first fuel cell catalyst form separate layers. In certain embodiments, the first conductive layer and first fuel cell catalyst further include a microdiffusion layer between the electrode and the catalyst. In certain embodiments, the first conductive electrode and the first fuel cell catalyst form an integral single layer (e.g., an IGEC). Thus, in certain embodiments, the first fuel cell catalyst can additionally act as a microdiffusion layer. In certain embodiments, the second conductive layer and second fuel cell catalyst further include a microdiffusion layer between the electrode and the catalyst. In certain embodiments, the second conductive electrode and the second fuel cell catalyst form an integral single layer (e.g., an IGEC). Thus, in certain embodiments, the second fuel cell catalyst can additionally act as a microdiffusion layer.

This invention also provides a fuel cell stack comprising a plurality of electrically connected electrode membrane combinations (membrane electrode assembly (MEAs0) as described herein. Also included are electrical devices comprising one or more such fuel cell stacks. In addition, this invention provides a battery replacement where the battery replacement comprises a container containing a fuel cell stack as described herein, and where the container provides a positive electrode terminal and a negative electrode terminal for contacting to a device requiring electricity. In certain embodiments, the battery replacement powers a home, a cell phone, a lighting system, a computer, and/or an appliance.

In certain embodiments, this invention provides methods of fabricating a fuel catalyst. The methods typically involve providing a plurality of nanoparticles; and depositing on the nanoparticles a substantially continuous catalytically active thin film, e.g. a thin film comprising platinum or a platinum alloy. The depositing can be by any suitable method including but not limited to sputtering deposition, chemical vapor deposition (CVD), molecular beam epitaxy (MBE), plasma-assisted vapor deposition, and electron beam evaporation deposition. The film can partially or fully cover the nanoparticles. In certain embodiments, the nanoparticles are nanotubes comprising a nanotube growth catalyst as described herein. The thin film typically includes any of the metals or metal alloys described herein and typically ranges in thickness as described herein. The nanoparticles can be provided attached to a substrate (e.g., one or more carbon fibers, a porous carbon substrate, a porous electrode, etc.). Suitable nanoparticles, include, but are not limited to nanotubes, nanofibers, nanohorns, nanopowders, nanospheres, and quantum dots. In certain preferred embodiments, the nanoparticles are carbon nanotubes as described herein.

This invention also provides methods of preparing a fuel cell element. The method typically involves providing a plurality of fibers and/or a porous electrode material; depositing a nanoparticle catalyst on the plurality of fibers and/or porous electrode material; forming nanoparticles on the plurality of fibers and/or porous electrode material using the nanoparticles catalyst; and forming a catalytically active layer comprising a substantially continuous thin film on the nanoparticles thereby forming a fuel cell element comprising a plurality of fibers bearing nanoparticles partially or fully coated with a catalytically active thin film. In certain embodiments, the plurality of fibers comprises a plurality of carbon fibers (e.g., a carbon fiber paper or other porous carbon electrode). In certain embodiments, the nanoparticle catalyst is a carbon nanotube catalyst, e.g. as described herein, and/or the nanoparticles are carbon nanotubes, e.g., as described herein and/or the substantially continuous thin film is a catalytically active thin film, e.g., as described herein. In certain embodiments, the nanoparticles are formed by chemical vapor deposition (CVD). In certain embodiments, the depositing a nanoparticle catalyst comprises depositing the catalyst on fibers by chemical vapor deposition (CVD). In certain preferred embodiments, the nanotube growth catalyst is a catalyst selected from the group consisting of $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_y$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$. Certain suitable catalysts include, but are not limited to $Co_{0.88}Mo_{0.12}$, $Co_{0.22}Ni_{0.56}Mo_{0.22}$, $Co_{0.57}Ni_{0.21}V_{0.11}Cr_{0.11}$, $Ni_{0.8}Mo_{0.1}Al_{0.1}$, and $Co_{0.64}Ni_{0.24}Al_{0.12}$. In certain embodiments, providing a plurality of fibers and/or a porous electrode material comprises providing a carbon fiber paper; depositing a nanoparticle catalyst comprises depositing said catalyst by chemical vapor deposition; forming nanoparticles comprises forming carbon nanotubes; and forming a catalytically active layer comprising depositing a substantially continuous thin film comprising platinum or a platinum alloy.

This invention also provides a method of making a carbon nanotube for use in a fuel cell. The method typically involves providing a nanotube growth catalyst selected from the group consisting of $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$; and forming a carbon nanotube on said catalyst (e.g. by CVD). In certain embodiments, the catalyst is a catalyst selected from the group consisting of $Co_{0.88}Mo_{0.12}$, $Co_{0.22}Ni_{0.56}Mo_{0.22}$, $Co_{0.57}Ni_{0.21}V_{0.11}Cr_{0.11}$, $Ni_{0.8}Mo_{0.1}Al_{0.1}$, and $Co_{0.64}Ni_{0.24}Al_{0.12}$.

Also provided is a carbon nanotube comprising a nanotube growth catalyst selected from the group consisting of $Co_{1-x}Mo_x$ where $0 \leq x \leq 0.3$, $Co_{1-x-y}Ni_xMo_y$ where $0 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$. In certain embodiments, the catalyst is a catalyst selected from the group consisting of $Co_{0.88}Mo_{0.12}$, $Co_{0.22}Ni_{0.56}Mo_{0.22}$, $Co_{0.57}Ni_{0.21}V_{0.11}Cr_{0.11}$, $Ni_{0.8}Mo_{0.1}Al_{0.1}$, and $Co_{0.64}Ni_{0.24}Al_{0.12}$.

Carbon nanotube growth catalysts (e.g., for growing carbon nanotubes for use in a fuel cell) are also provided. Preferred catalysts include catalysts selected from the group consisting of $Co_{1-x}Mo_x$ where $0 \leq x \leq 0.3$, $Co_{1-x-y}Ni_xMo_y$ where $0.1 \leq x \leq 0.7$ and $0 \leq y \leq 0.3$, $Co_{1-x-y-z}Ni_xV_yCr_z$ where $0 \leq x \leq 0.7$ and $0 \leq y \leq 0.2$, $0 \leq z \leq 0.2$, $Ni_{1-x-y}Mo_xAl_y$ where $0 \leq x \leq 0.2$ and $0 \leq y \leq 0.2$, and $Co_{1-x-y}Ni_xAl_y$ where $0 \leq x \leq 0.7$ and $0 \leq y \leq 0.2$. In certain embodiments, the catalyst is selected from the group consisting of $Co_{0.88}Mo_{0.12}$, $Co_{0.22}Ni_{0.56}Mo_{0.22}$, $Co_{0.57}Ni_{0.21}V_{0.11}Cr_{0.11}$, $Ni_{0.8}Mo_{0.1}Al_{0.1}$, and $Co_{0.64}Ni_{0.24}Al_{0.12}$.

DEFINITIONS

The term "nanoparticles", as used herein refers to a particle having at least dimension equal to or smaller than about 500 nm, preferably equal to or smaller than about 100 nm, more preferably equal to or smaller than about 50 or 20 nm, or having a crystallite size of about 10 nm or less, as measured from electron microscope images and/or diffraction peak half widths of standard 2-theta x-ray diffraction scans.

The terms "membrane electrode assembly (MEA)" and "membrane electrode combination" are used interchangeably and typically refer at least two electrodes separated by a PEM.

The term "electrically coupled " when referring to a nanoparticles (e.g. nanoparticles catalyst) and an electrode refers to a coupling by which electrons or protons are capable of passing from the nanoparticles to the electrode or vice versa. The electrical coupling need not require actual physical contact between the nanoparticles and electrode. Thus electrical coupling includes, but is not limited to direct electron conduction, electron tunneling, inductive coupling, and the like.

The term "substantially continuous" when used with respect to "nanoparticles coated with a substantially continuous thin film" refers to a thin film that forms an essentially uniform coating where present on the nanoparticles. This is in contrast to a film that appears clumped or globular. The coating does not appear patchy or variegated. In certain embodiments, the film is substantially continuous over at least 20%, preferably substantially continuous over at least 30% or 40%, more preferably substantially continuous over at least 50% or 60% and most preferably substantially continuous over at least 70% or 80% of the surface of the nanoparticles.

The term "bearing" when used with reference to "a plurality of carbon fibers bearing nanoparticles" refers to nanoparticles adsorbed to the fibers, and/or chemically bonded (e.g., ionically, hydrophobically, covalently) to the fibers, and/or interleaved in interstices within or between the fibers.

The term "integrated gas-diffusion/electrode/catalyst (IGEC)" refers to a porous (gas diffusion electrode) comprising nanoparticles partially or fully covered with a substantially continuous catalytically active thin film (e.g. a platinum or platinum alloy thin film). In certain embodiments the IGEC also acts as an integral microdiffusion device.

The term fuel-cell element refers to an integral element comprising a that can be used in the construction of a fuel cell. In certain embodiments, the fuel-cell element is an IGEC.

The term "fuel cell catalyst" can refer to a catalytically active material (e.g. platinum or platinum alloy) for use in a fuel cell or to nanoparticles coated with a thin film of the catalytically active material. Thus, for example, in certain embodiments, the fuel cell catalyst comprises a plurality of nanoparticles said nanoparticles coated with a substantially continuous thin film comprising platinum or a platinum alloy. The particular usage will be clear from context.

The term "nanoparticles catalyst" refers to a material that acts as a catalyst and/or nucleation point, and/or "seed" for starting and/or guiding the formation of a nanoparticles.

A "catalytically active thin film" refers to a thin film capable of catalyzing one or more of the chemical reactions that occur in a fuel cell. In certain embodiments, the catalytically active thin film comprises platinum or a platinum alloy.

BRIEF DESCRIPTION OF THE DRAWINGS

FIG. 3A shows the load current of micro fuel cells as a function of Pt concentration in alloy catalysts of $Pt_xV_{1-x}$. The oxidation effect of $Pt_xV_{1-x}$ catalysts identified as V/Pt—O is compared for its stability. The tests were performed for catalysts on both cathode and anode sides. The micro fuel cells were fabricated by thermal pressing three layers of PtRu commercial electrode (from ElectroChem), Nafion 117, and Pt—V catalyst deposited on TORAY carbon paper. Each test was performed on 0.785 $mm^2$ area. FIG. 3B shows the load current of micro fuel cells as a function of Pt concentration in alloy catalysts of $Pt_xCo_{1-x}$. The oxidation effect of $Pt_xCo_{1-x}$ catalysts identified as Co/Pt—O is compared for its stability. The tests were performed for catalysts on both cathode and anode sides. The micro fuel cells were fabricated by thermal pressing three layers of PtRu commercial electrode (from ElectroChem), Nafion 117, and Pt—V catalyst deposited on TORAY carbon paper. Each test was performed on 0.785 $mm^2$ area.

FIG. 6A shows fuel cell voltage ploted as a function of output current per mg Pt content in the catalysts. Three samples compared are (1) a standard assembled three-layer fuel cell purchased from ElectroChem with 1 mg/cm$^2$ Pt catalysts, (2) $Pt_{0.12}Co_{0.88}$ thin film catalyst directly coated on carbon fiber paper, and (3) $Pt_{0.12}Co_{0.88}$ thin film catalyst coated on carbon nanotubes which are directly grown on carbon fiber paper. FIG. 6B shows fuel cell power per mg Pt content in the catalysts plots as a function of output current. Three samples compared are (1) a standard assembled three-layer fuel cell purchased from ElectroChem with 1 mg/cm$^2$ Pt catalysts, (2) $Pt_{0.12}Co_{0.88}$ thin film catalyst directly coated on carbon fiber paper, and (3) $Pt_{0.12}Co_{0.88}$ thin film catalyst coated on carbon nanotubes which is directly grown on carbon fiber paper.

FIG. 7A shows fuel cell cell voltage plotted as a function of output current per mg Pt content in the catalysts. Three samples compared are (1) a standard assembled three-layer fuel cell purchased from ElectroChem with 1 mg/cm$^2$ Pt catalysts, (2) $Pt_{0.12}Co_{0.88}$ thin film catalyst coated on carbon nanotubes which is directly grown on carbon fiber paper, and (3) Pt0.24Co0.76 thin film catalyst coated on carbon nanotubes which is directly grown on carbon fiber paper. FIG. 7B shows fuel cell power per mg Pt content in the catalysts plots as a function of output current. Three samples compared are (1) a standard assembled three-layer fuel cell purchased from ElectroChem with 1 mg/cm$^2$ Pt catalysts, (2) $Pt_{0.12}Co_{0.88}$ thin film catalyst coated on carbon nanotubes which is directly grown on carbon fiber paper, and (3) Pt0.24Co0.76 thin film catalyst coated on carbon nanotubes which are directly grown on carbon fiber paper.

FIG. 8A shows fuel cell voltage plots as a function of output current per mg Pt content in the catalysts. Three samples compared are (1) a standard assembled three-layer fuel cell purchased from ElectroChem with 1 mg/cm2 Pt catalysts, (2) $Pt_{0.12}Co_{0.88}$ thin film catalyst coated on carbon nanotubes which is directly grown on carbon fiber paper with 200 Å Ni catalyst, and (3) $Pt_{0.12}Co_{0.88}$ thin film catalyst coated on carbon nanotubes which is directly grown on carbon fiber paper with 400 Å catalyst. FIG. 8B shows fuel cell power per mg Pt content in the catalysts plots as a function of output current. Three samples compared are (1) a standard assembled three-layer fuel cell purchased from ElectroChem with 1 mg/cm$^2$ Pt catalysts, (2) $P_{r0.12}Co_{0.88}$ thin film catalyst coated on carbon nanotubes which is directly grown on carbon fiber paper with 200 Å Ni catalyst, and (3) $Pt_{0.12}Co_{0.88}$ thin film catalyst coated on carbon nanotubes which is directly grown on carbon fiber paper with 400 Å Ni catalyst.

FIG. 9A shows fuel cell voltage plots as a function of output current per mg Pt content in the catalysts. Three samples compared are (1) a standard assembled three-layer fuel cell purchased from ElectroChem with 1 mg/cm$^2$ Pt catalysts, (2) $Pt_{0.12}Co_{0.88}$ thin film catalyst coated on carbon nanotubes which is directly grown on carbon fiber paper with 200 Å Co catalyst, and (3) $Pt_{0.12}Co_{0.88}$ thin film catalyst coated on carbon nanotubes which is directly grown on carbon fiber paper with 200 Å Ni catalyst. FIG. 9B shows fuel cell power per mg Pt content in the catalysts plots as a function of output current. Three samples compared are (1) $Pt_{0.12}Co_{0.88}$ thin film catalyst directly coated on carbon fiber paper, (2) $Pt_{0.12}Co_{0.88}$ thin film catalyst coated on carbon nanotubes which is directly grown on carbon fiber paper with 200 Å Co catalyst, and (3) $Pt_{0.12}Co_{0.88}$ thin film catalyst coated on carbon nanotubes which is directly grown on carbon fiber paper with 200 Å Ni catalyst.

DETAILED DESCRIPTION

Figure 1:
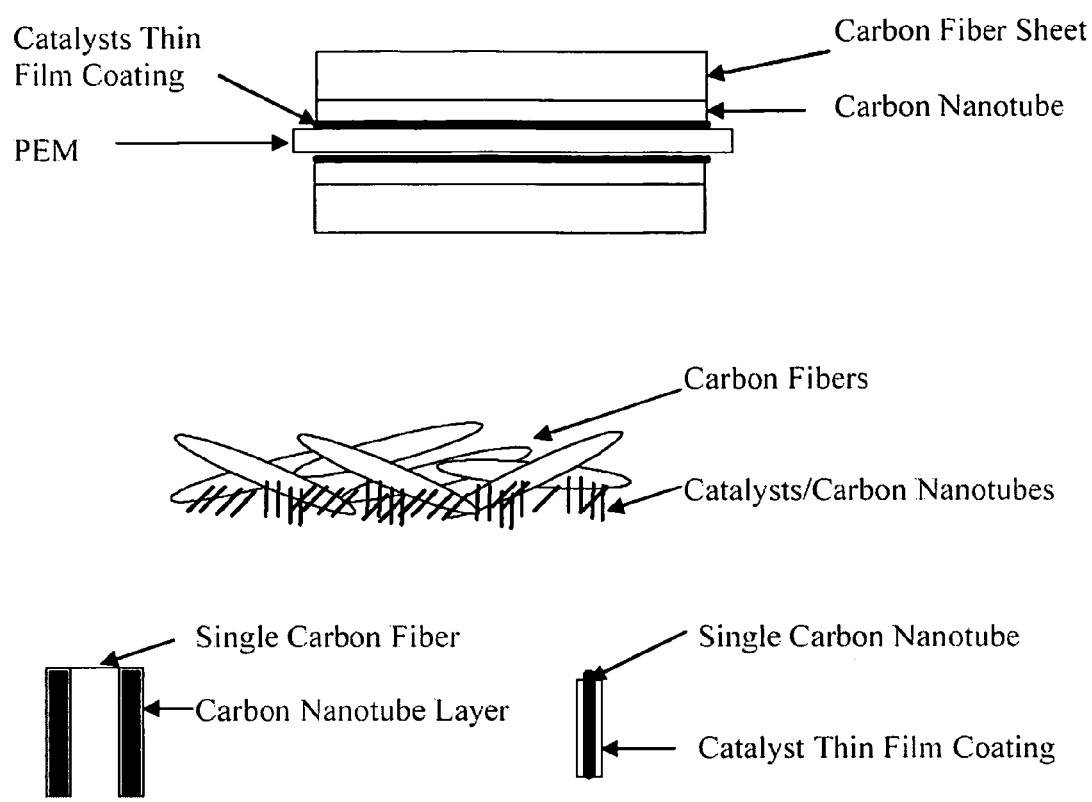
FIG. 1 shows a schematic of a detailed structure of catalyst thin-film/carbon-nanotubes layer/carbon-fiber-sheet.

I. Fuel Cell Catalysts.

This invention pertains to the development of improved catalysts and integrated gas-diffusion/electrode/catalysts (IGEC) for use in fuel cells. Also provided are fuel cells, fuel cell electrode combinations that utilize the improved catalysts.

In certain embodiments, the catalysts of this invention comprise nanoparticles coated with a substantially continuous thin film comprising a catalytically active metal (e.g. platinum, platinum alloys, etc.). Without being bound to a particular theory, it is believed the catalytic efficiency of the thin film is increased by increasing the effective reactive surface area by depositing the thin film comprising a catalytically active metal or alloy on nanoparticles. The nanoparticles can be partially coated with the substantially continuous thin film or completely covered with the film. In typical embodiments, the thin film ranges in thickness from about 1 nm to about 500 nm, preferably from about 2 nm to about 300 nm, more preferably from about 5 nm to about 100 nm and most preferably from about 10 nm to about 50 nm.

The nanoparticles can include any of a wide range of nanoparticles. Typical nanoparticles have at least one dimension small than about 500 nm, more preferably at least two dimensions or three dimensions each less than about 500 nm. In certain embodiments, the nanoparticles are characterized by at least one dimension smaller than about 100 nm or 50 nm.

Suitable nanoparticles include, but are not limited to various fullerenes, carbon nanotubes, carbon nanohorns, carbon (and other) nanofibers, nano sphere/powder, quantum dots, metal encapsulated fullerenes, and the like. In certain preferred embodiments, the nanoparticles incorporate carbon. Thus, carbon-based nanoparticles including, but not limited to carbon nanotubes, carbon nanohorns, carbon nanofibers, nano sphere/powder, and the like are particularly well suited for use in the catalysts of this invention.

The nanoparticles can take any of a number of possible morphologies and still be suitable for use in the present invention. Thus, for example, this invention contemplates using nanotubes of the following kinds: single walled, double walled, multi walled, with zig-zag chirality, or a mixture of chiralities, twisted, straight, bent, kinked, curled, flattened, and round; ropes of nanotubes, twisted nanotubes, braided nanotubes; small bundles of nanotubes (e.g., in certain embodiments, with a number of tubes less than about ten), medium bundles of nanotubes (e.g., in certain embodiments, with a number of tubes in the hundreds), large bundles of nanotubes (e.g. in certain embodiments, with a number of tubes in the thousands); nanotorii, nanocoils, nanorods, nanowires, nanohorns; empty nanocages, filled nanocages, multifaceted nanocages, empty nanococoons, filled nanococoons, multifaceted nanococoons; thin nanoplatelets, thick nanoplatelets, intercalated nanoplatelets, and the like. The various nanoparticles (nanostructures) can assume heterogeneous forms. Such heterogeneous forms include, but are not limited to structures, where one part of the structure has a certain chemical composition, while another part of the structure has a different chemical composition. An example is a multi walled nanotube, where the chemical composition of the different walls can be different from each other. Heterogeneous forms also include different forms of nanostructured material, where more than one of the above listed forms are joined into a larger irregular structure. In addition, in certain embodiments any of the above materials can have cracks, dislocations, branches or other impurities and/or imperfections.

Methods of manufacturing nanoparticles are well known to those of skill in the art. Thus, for example, methods for the preparation of carbon nanotubes are described in U.S. Pat. Nos. 6,451,175, 6,713,519, 6,712,864, 6,709,471, and by Hafner et al. (1999) *J. Am. Chem. Soc.,* 121: 9750-9751; Hafner et al. (1999) *Scientific Correspondence* 398: 761-762; and the like. Similarly, the production of nanohorns is described, e.g., by Berber et al. (2000( *Physical Review B,* 62(4): R2291-2294, while the production of nanofibers is described, for example in U.S. Pat. Nos. 6,706,248, 6,485, 858, and the like.

In the catalysts of this invention, the nanoparticles are partially or completely covered with a substantially continuous thin film comprising a catalytically active metal or alloy. In certain embodiments, the catalytically active metal or alloy comprises platinum (Pt). Suitable alloys include, but are not limited to binary alloys such as Pt—Cr, Pt—V, Pt—Ta, Pt—Cu, Pt—Ru, Pt—Y, etc., and/or ternary alloys including but not limited to Pt—Ru—Os, Pt—Ni—Co, Pt—Cr—C, Pt—Cr—Ce, Pt—Co—Cr, Pt—Fe—Co, Pt—Ru—Ni, Pt—Ga—Cr—Co, Pt—Ga—Cr—Ni, Pt—Co—Cr, etc., and/or quaternary alloys including, but not limited to Pt—Ni—Co—Mn, Pt—Fe—Co—Cu, etc.

Figure 2:
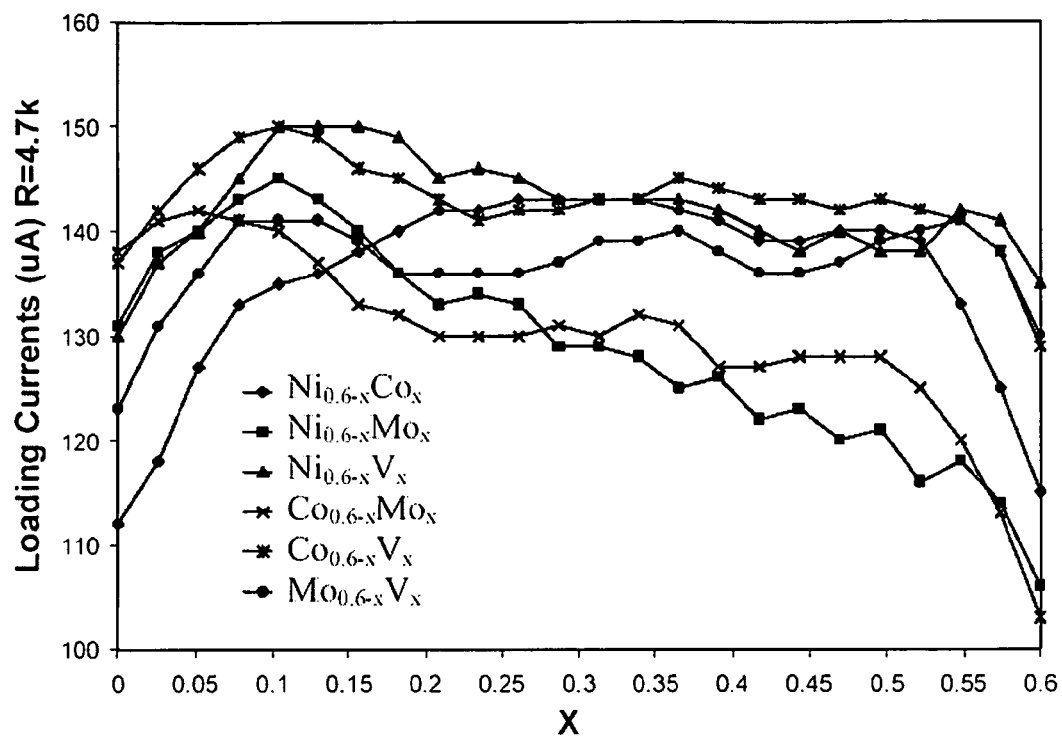
FIG. 2 shows the load current of micro fuel cells as a function of composition of four continuous ternary catalysts of Ni—Co, Ni—Mo, Ni—V, Co—Mo, Co—V and Mo—V at fixed 40% Pt in each alloy system on cathode side. The micro fuel cells were fabricated by thermal pressing three layers of Pt—Ru commercial electrode (from ElectroChem), Nafion 117, and catalyst libraries deposited on TORAY carbon fiber paper. Each test was performed on 0.785 $mm^2$ area.
Figure 3A:
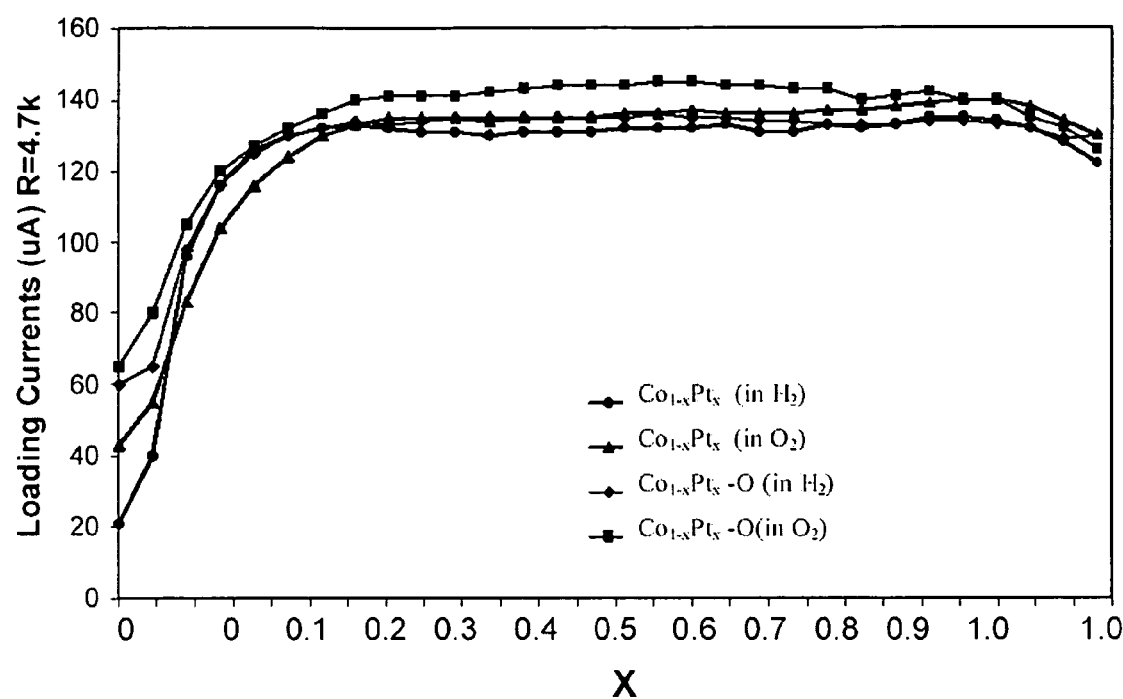
FIGS. 3A and 3B show the load current of micro fuel cells as a function of Pt concentration in various platinum alloy catalysts.
Figure 3B:
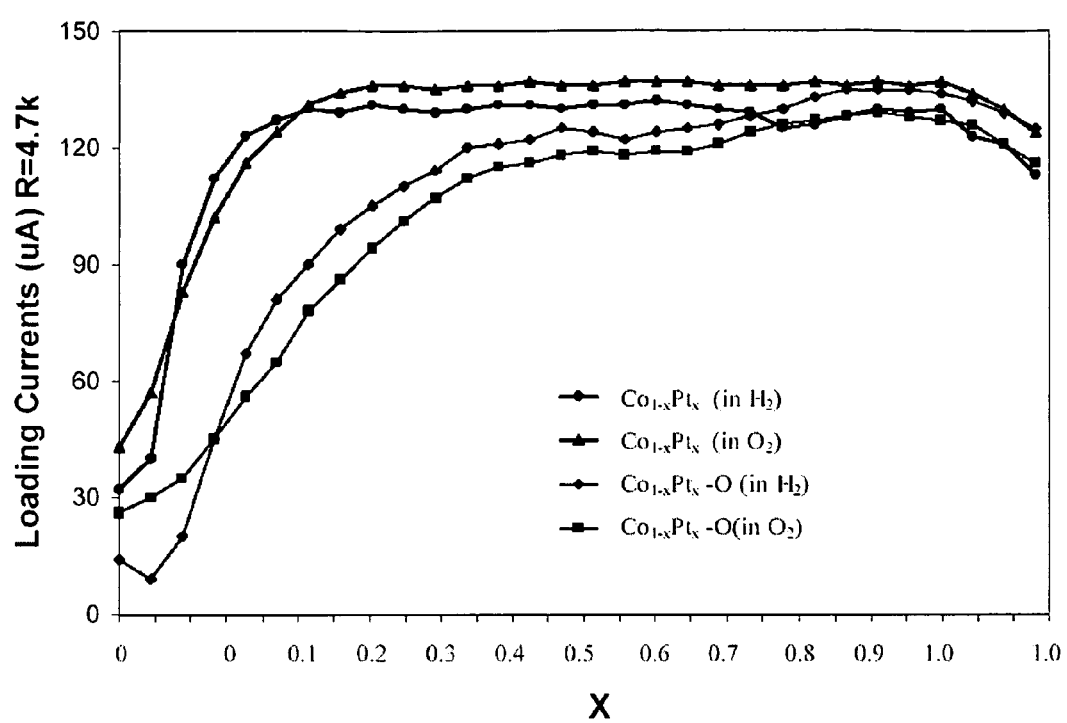
Figure 4:
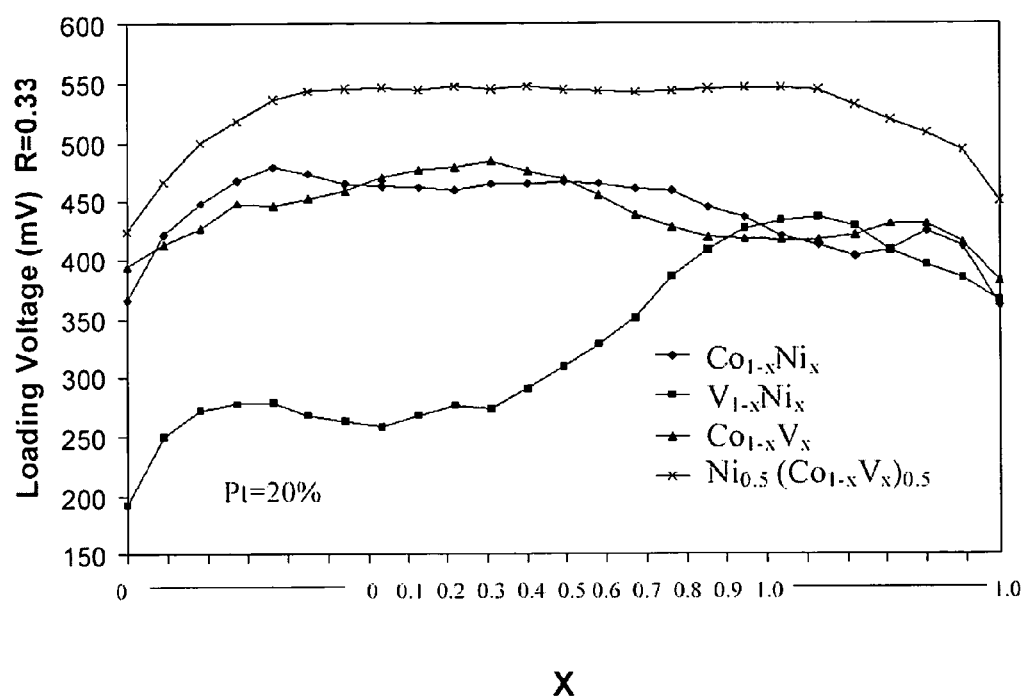
FIG. 4 shows the load voltage of micro fuel cells as a function of composition of four continuous ternary catalysts of Ni—Co, Ni—V, Co—V and quaternary catalyst of $Ni0.5(Co_{1-x}V_x)_{0.5}$ at fixed 20% Pt in each alloy system on cathode side. The micro fuel cells were fabricated by thermal pressing three layers of Pt—Ru commercial electrode (from ElectroChem), Nafion 117, and catalyst libraries deposited on TORAY carbon fiber paper. Each test was performed on 0.785 $mm^2$ area.

Platinum content per unit area (e.g., per unit area of catalyst) is one of the most important cost criteria for practical PEM fuel cell applications. In certain embodiments, binary, ternary and quaternary composition of Pt alloys that contains Co, Ni, Mo and V, are optimized e.g. as illustrated in FIG. 2. Vanadium was found to enhance significantly catalyst oxidation resistance as shown in FIG. 3. Thus, in certain embodiments, the thin film comprises an alloy comprising platinum (Pt) and vanadium (V) and, optionally, one or more additional metals (e.g. Co, Ni, Mo, Ta, W, Zr, etc.). In certain embodiments, a PtNiCoV alloy is a preferred Pt alloy catalyst system for both anode and cathode of PEM fuel cells as shown in FIG. 4.

Platinum (Pt) concentration was also optimized in a platinum alloy system. FIGS. 3A and 3B show that the output current of fuel cell increase quickly as Pt concentrations increase, but the output current saturates at about 12% Pt in both Pt—V and Pt—Co alloy systems. Therefore, In certain embodiments, a preferred platinum concentration in a platinum catalyst alloy is 12% or less for both cathodes and/or anodes of PEM fuel cells.

In certain embodiments, the thin film comprises an alloy having the formula: $Pt_xV_yCo_zNi_w$, where x is greater than 0.06 and less than 1; y, z, and w are independently greater than zero and less than 1; and $x+y+z+w=1$.

Figure 5:
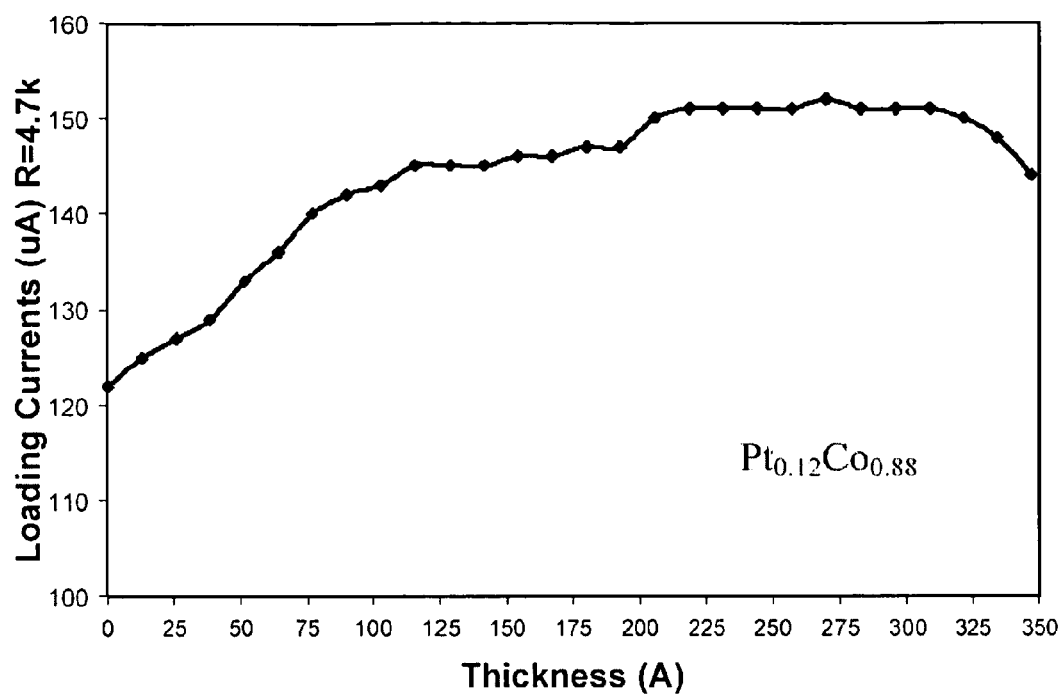
FIG. 5 shows the load current of micro fuel cells as a function of catalyst thickness layer on both cathode and anode sides. The micro fuel cells were fabricated by thermal pressing three layers of Pt—Ru commercial electrode (from ElectroChem), Nafion 117, and catalyst libraries deposited on TORAY carbon fiber paper. Each test was performed on 0.785 mm$^2$ area.

The catalyst layer thickness was also optimized in certain embodiments so as to minimize platinum content. FIG. 5 shows that the current output saturates at a thin film thickness about 100 Å for a catalyst $Pt_{0.12}Co_{0.88}$ alloy. Consequently, in certain preferred embodiments, the thickness of thin film Pt alloy catalysts is 100 A or less cathodes and/or anodes of PEM fuel cells.

The thin films can be applied to the nanoparticles by any of a number of convenient methods. In certain embodiments, the thin films can be applied by simple chemical methods. Thus for example, in certain embodiments, the thin film can be applied to the nanoparticles by direct spraying or by exposing the nanoparticles to a solvent containing the thin film materials and allowing the solvent to evaporate away. In certain embodiments, the thin film can be electro-deposited (e.g. electroplated) onto the nanoparticles. In certain other embodiments, the thin film is applied to the nanoparticles by conventional semiconductor processing methods, e.g. sputtering, chemical vapor deposition (CVD), molecular beam epitaxy (MBE), plasma-assisted vapor deposition, and the like (see, e.g., Choudhury (1997) *The Handbook of Microlithography, Micromachining, and Microfabrication,* Soc. Photo-Optical Instru. Engineer, Bard & Faulkner (1997) *Fundamentals of Microfabrication,* and the like).

Figure 6A:
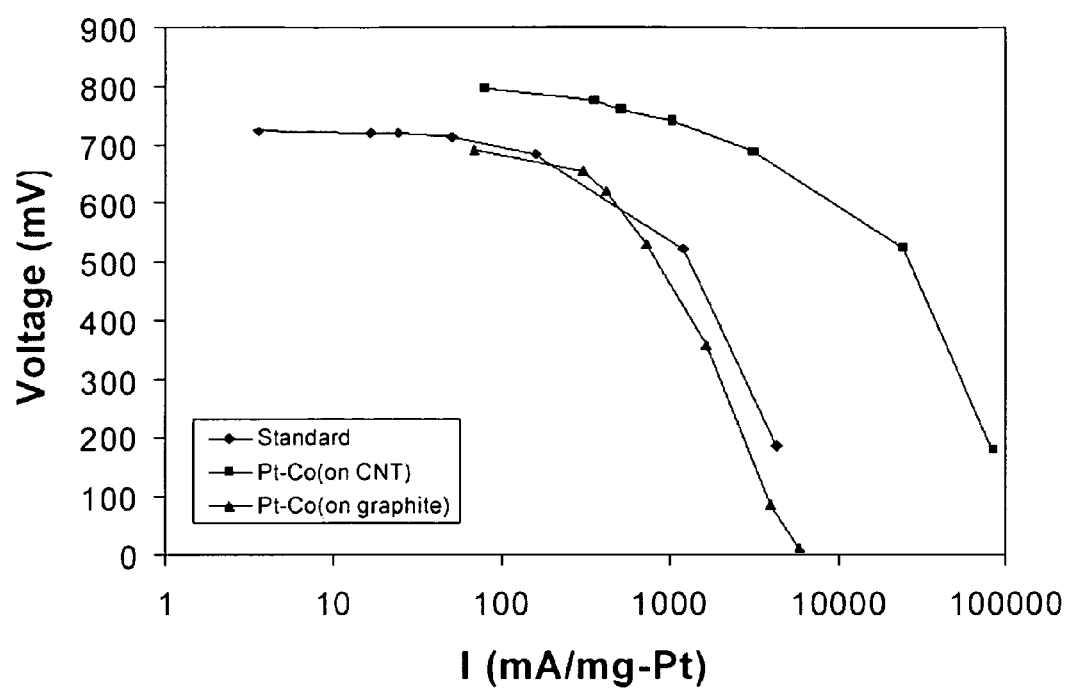
FIGS. 6A and 6B show the effect of nanostructures on the output current of fuel cells.
Figure 6B:
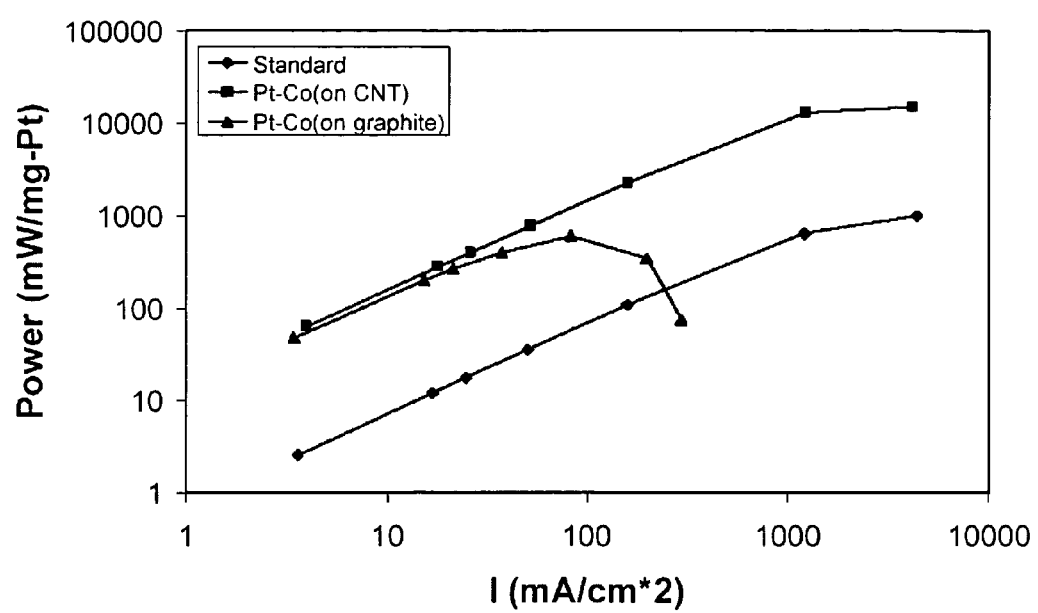
Figure 7A:
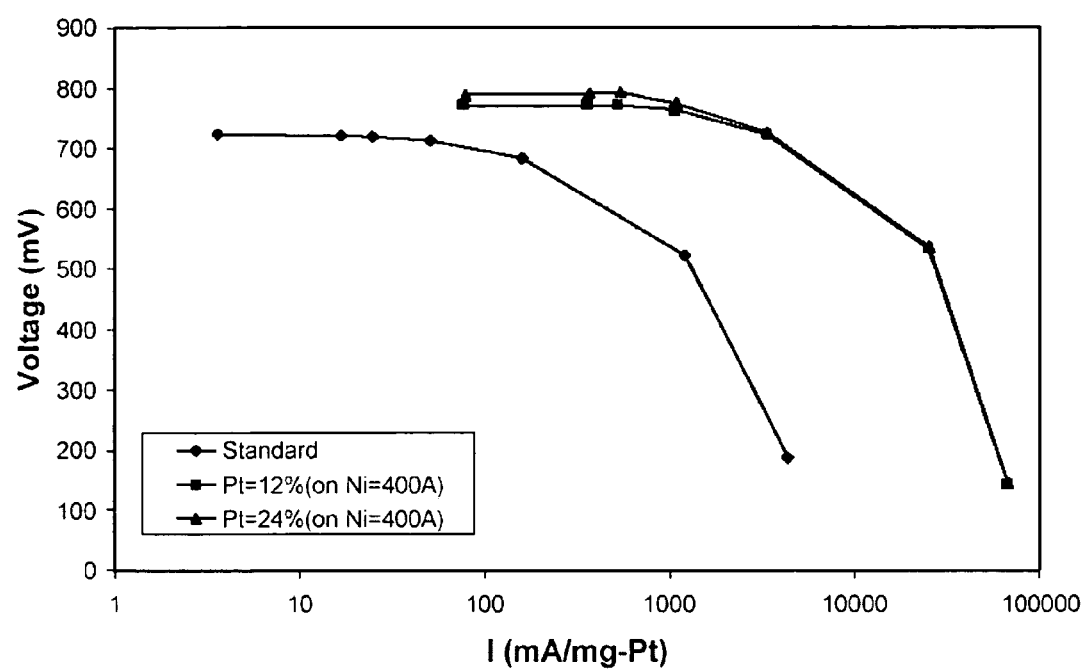
FIGS. 7A and 7B show the effect of platinum content on the power output of fuel cells.
Figure 7B:
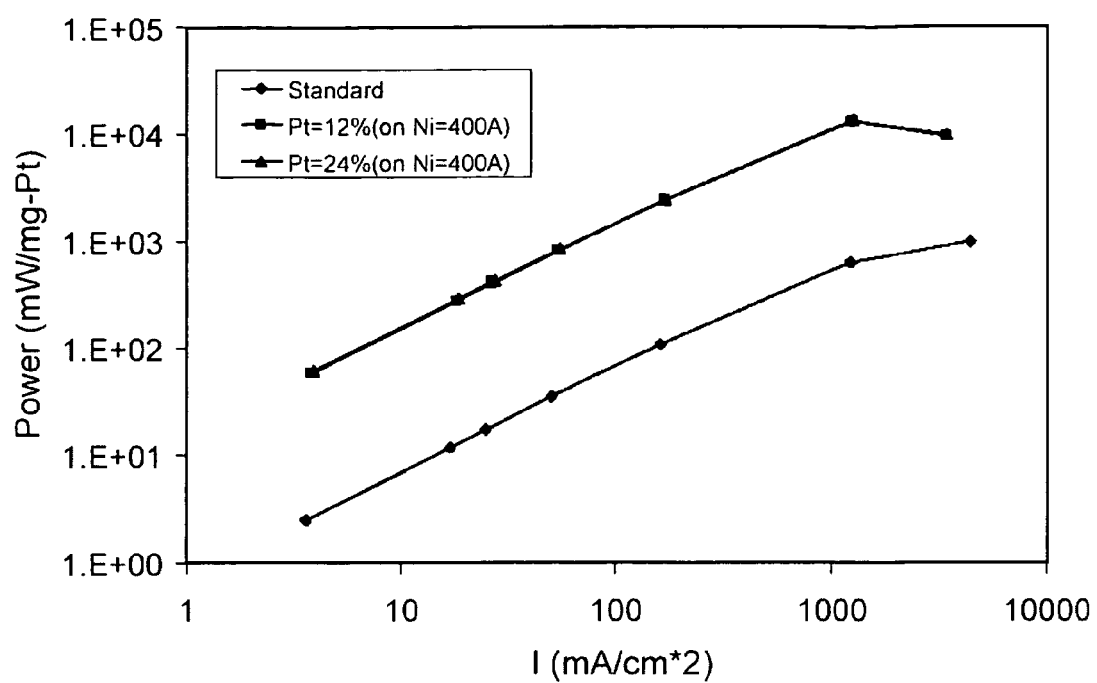

As indicated above, the catalytic efficacy of the thin film is increased by providing the thin film as a substantially continuous thin film on nanoparticles (e.g., carbon nanotubes). For example, FIG. 6A shows that the carbon nanotube supported $Pt_{0.12}Co_{0.88}$ catalysts can increase the output current per mg Pt by one order of magnitude under the same operation voltage. FIG. 6B shows that the carbon nanotube supported $Pt_{0.12}Co_{0.88}$ catalysts can increase the output power per mg Pt by one order of magnitude within entire current operation range. FIGS. 7A and 7B again confirms that 12% Pt is sufficient for carbon nanotube supported Pt alloy catalysts.

Figure 8A:
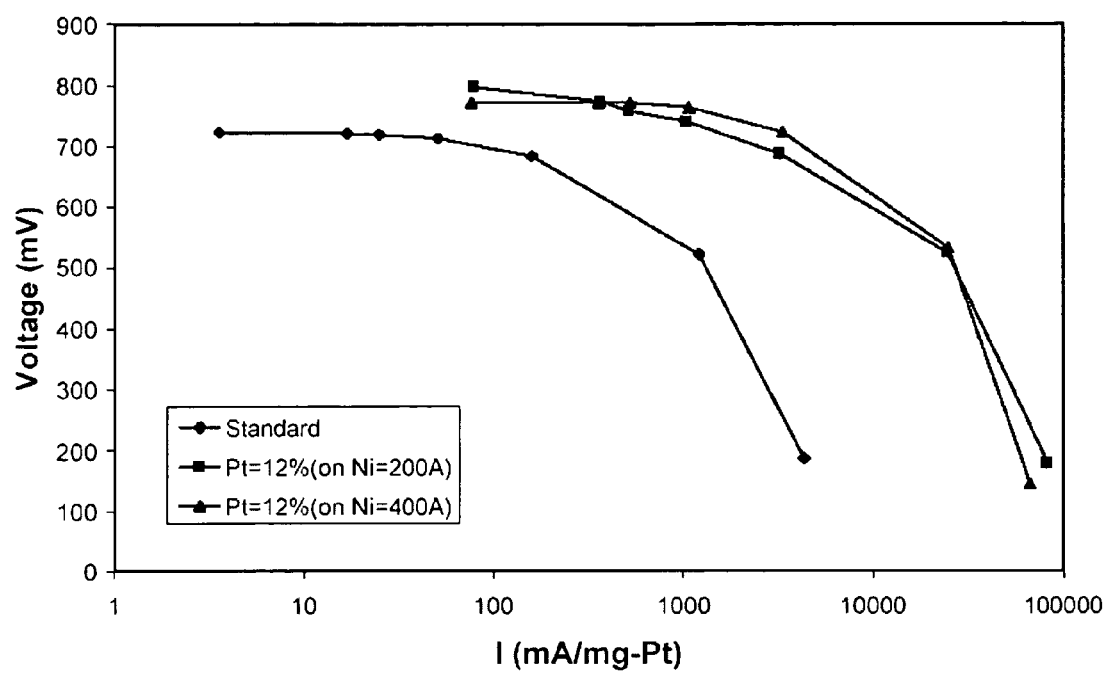
FIGS. 8A and 8B show power output of fuel cells.
Figure 8B:
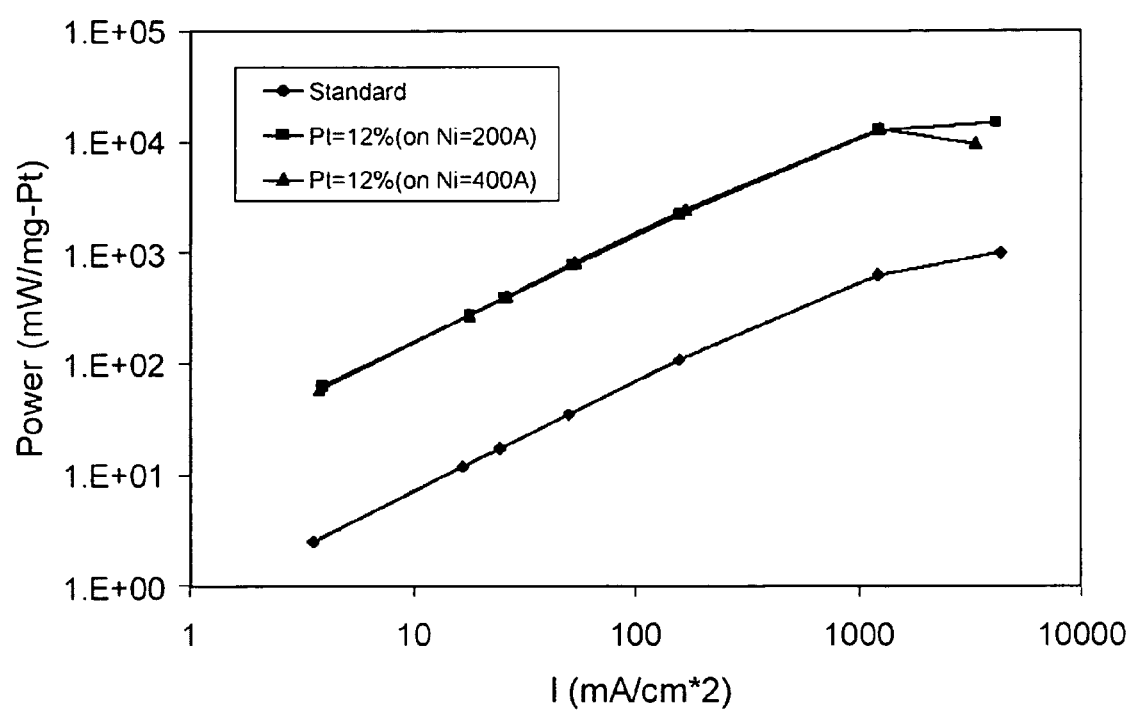
Figure 9A:
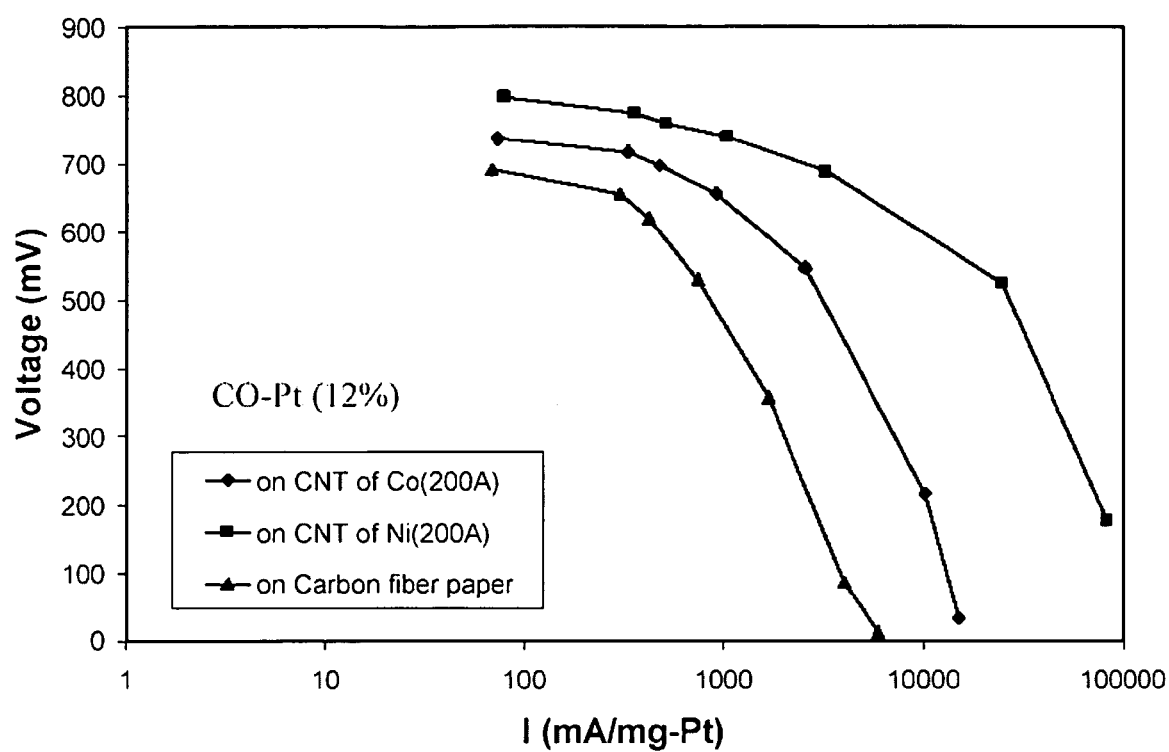
FIGS. 9A 9B show the effect of nanostructures on fuel cell output.
Figure 9B:
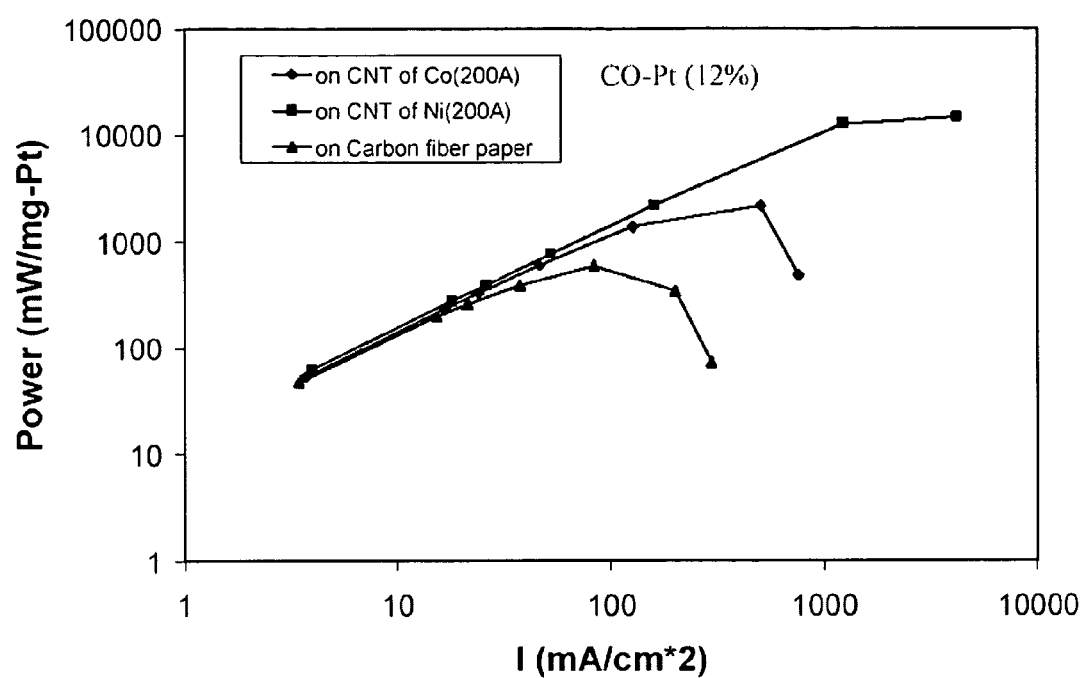
Figure 13:
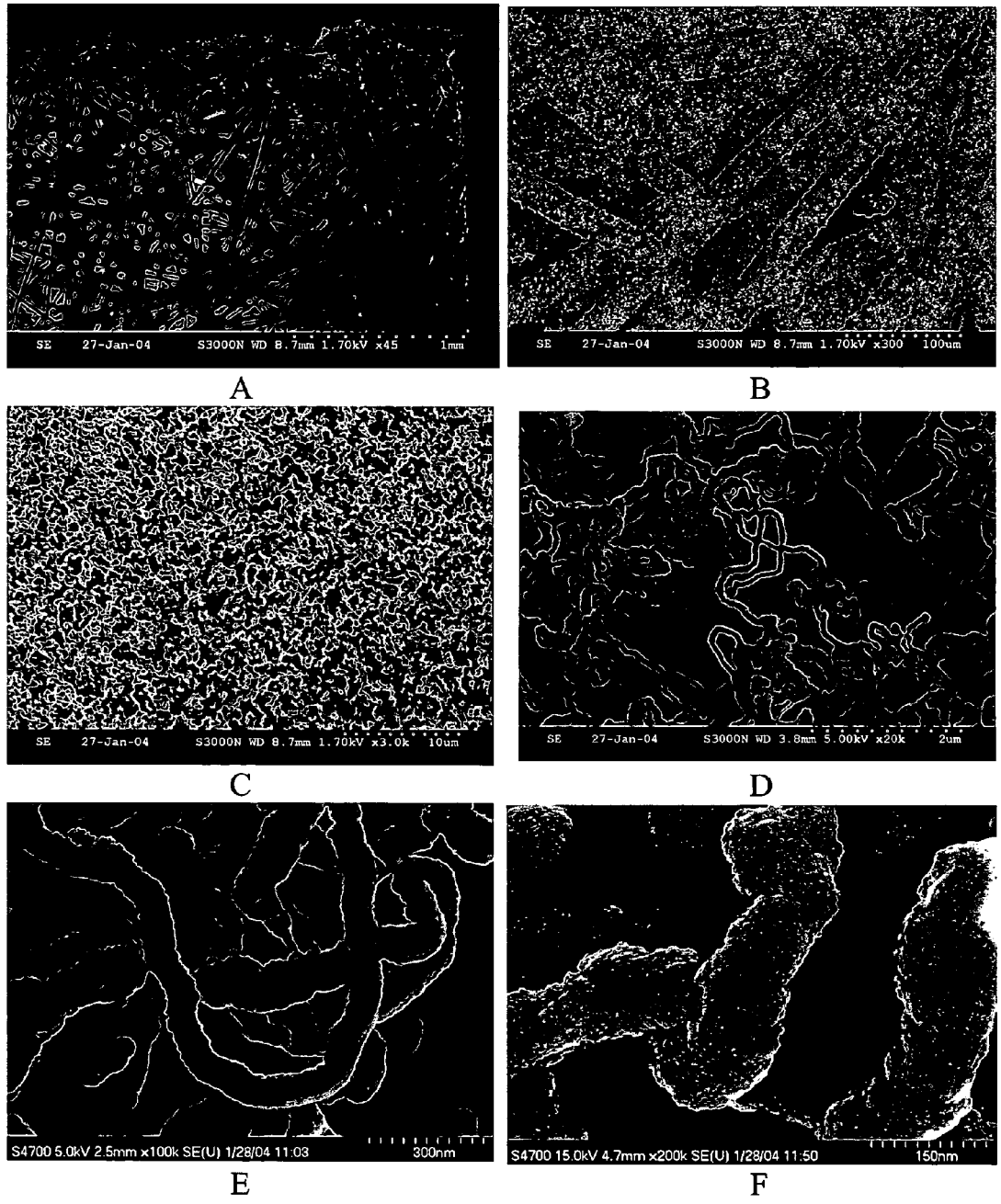

FIGS. 8A and 8B indicate that the density and size of carbon nanotubes, which are controlled by catalyst thickness, growth time and catalyst material effect catalyst performance. In certain embodiments, preferred carbon nanotubes are few to 100 nanometers with optimized density. FIG. 13 shows structures of thin-film catalyst coated on carbon nanotubes which are directly grown on carbon fibers in the top layer of Toray carbon paper at magnifications from 45 to 200,000 times by scanning electron microscope. The carbon nanotubes were uniformly grown on individual fibers as shown in FIG. 13 (panel b). The carbon nanotube layer is about 10 μm thick with uniform networks as shown in FIG. 13, panels c, d, and e. FIG. 13, panel f, shows that Pt thin films (catalysts) are continuous thin films on carbon nanotubes.

The nanoparticles used in the catalysts of this invention can be provided in various forms, e.g. in solution, as a dried powder, and/or grown on porous substrates. In certain embodiments, the nanoparticles are grown and retained on a porous substrate. In certain embodiments, this porous substrate can itself act as an electrode.

III. Optimization of Nanoparticles Catalysts (Seeds).

In certain embodiments, this invention pertains to the optimization of catalysts for the growing of nanoparticles, more preferably for the growing of carbon nanotubes. In certain preferred embodiments, nanoparticles (e.g. carbon nanotubes) are grown on supports (e.g. carbon fibers) and then coated with a substantially continuous thin film (e.g., a catalytically active thin film).

When certain nanoparticles (e.g., carbon nanotubes) are grown, the nanoparticles catalyst ("seed") is often exposed on the surface of the nanoparticles (e.g. at the end of a carbon nanotube). Consequently, when a thin film is applied to the nanoparticlena noparticle catalyst (seed) particles mix material forming the thin film and can alter the catalytic activity of the thin film. Thus, it is desirable to grow the nanoparticles using nanoparticles catalyst materials that compatible bothw the with growth of the nanoparticles and either enhance or do not substantially adversely effect the catalytic activity of the applied thin film.

It was a surprising discovery that not all nanoparticles catalysts catalysts are good for both nanoparticles growth and fuel cell operation. Thus, for example, iron, is a good for growing carbon nanotubes, but interferes with the catalytic activity of the applied thin film. Some elements, such as aluminum, appear to have no adverse effects on fuel cell operation. Some elements or their alloys are good for both nanoparticles (e.g., carbon nanotube) growth and fuel cell operation. These "optimal" seed materials include, buta re nto limited to Co, Ni, V, and Mo.

It was surprising discovery that the alloys listed below are particularly well suited for carbon nanotube growth and also fuel cell operation. They enhance the fuel cell catalytic properties greatly.

1. $Co_{1-x}Mo_x$ where $0 \leq x \leq 0.3$;
2. $Co_{1-x-y}Ni_xMo_y$ where $0.1 \leq x \leq 0.7$ and $0 \leq y \leq 0.3$;
3. $Co_{1-x-y-z}Ni_xV_yCr_z$ where $0 \leq x \leq 0.7$, $0 \leq y \leq 0.2$, and $0 \leq z \leq 0.2$;
4. $Ni_{1-x-y}Mo_xAl_y$ where $0 \leq x \leq 0.2$, $0 \leq y \leq 0.2$; and
5. $Co_{1-x-y}Ni_xAl_y$ where $0 \leq x \leq 0.7$, and $0 \leq y \leq 0.2$.

In certain particularly preferred embodiments the catalysts for growing the nanoparticles include, one or more of the following: $Co_{0.88}Mo_{0.12}$, $Co_{0.22}Ni_{0.56}Mo_{0.22}$, $Co_{0.57}Ni_{0.21}V_{0.11}Cr_{0.11}$, $Ni_{0.8}Mo_{0.1}Al_{0.1}$, and $Co_{0.64}Ni_{0.24}Al_{0.12}$.

IV. Electrode-Membrane Combinations and Fabrication Methods.

In certain embodiments, the fuel cell catalysts of this invention (nanoparticles partially or completely covered with a substantially continuous thin film) are fabricated into electrode/membrane combinations. One typical electrode/membrane combination includes at least a first conductive electrode comprising a first fuel cell catalyst (nanoparticles partially or completely coated with a substantially continuous catalytic thin film); at least a second conductive electrode comprising a second fuel cell catalyst; and a proton exchange membrane separating the first conductive electrode and the second conductive electrode.

In a more traditional configuration (see, e.g., "A" in FIG. 14), the catalyst (nanoparticles coated with a thin film) forms a separate layer on the electrode or on a polymer membrane. In addition, a microdiffusion layer can optionally be present. Such a configuration thus comprises seven discrete layers (two electrodes, two catalyst layers, two microdiffusion layers, and a PEM). It is a surprising discovery and advantage of the present invention however, that the nanoparticles can interleave with the fibers comprising a gas-diffusable electrode (e.g. a carbon fiber sheet) and thus the fuel cell catalyst (thin-film coated nanoparticles) can be fabricated so that they are integral with the electrode. In addition the nanoparticles catalyst is itself capable of acting as a microdiffusion layer, so no additional microdiffusion layer is necessary or desired. Thus, in certain embodiments, this invention contemplates a integrated gas-diffusion/electrode/catalyst (IGEC) and membrane combination comprising only three layers; e.g., two IGEC layers separated by a proton exchange membrane (see, e.g., "B" in FIG. 14).

Figure 10:
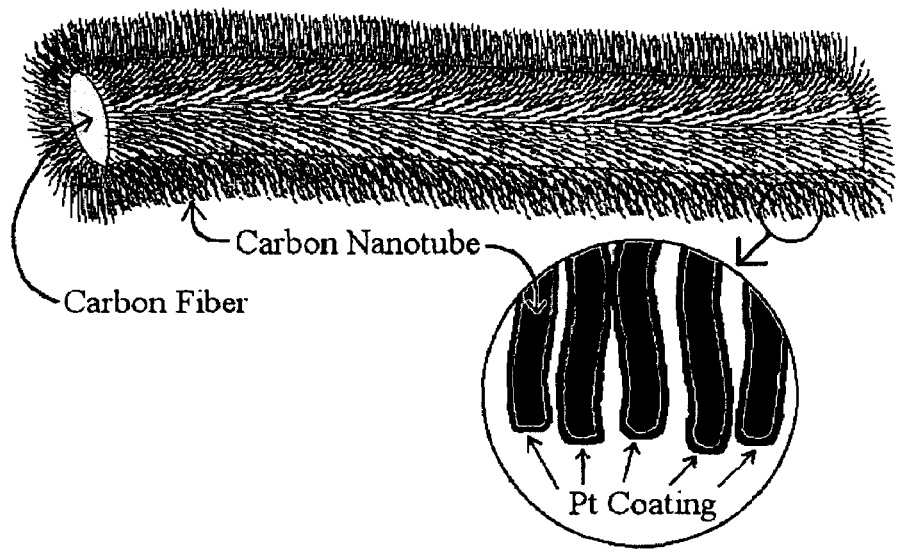
FIG. 10 illustrates a nanoparticles (e.g., carbon nanotubes) grown on fibers (e.g., carbon fibers). The nanoparticles are partially or completely coated with a catalytically active substantially continuous thin film (see inset).
Figure 11:
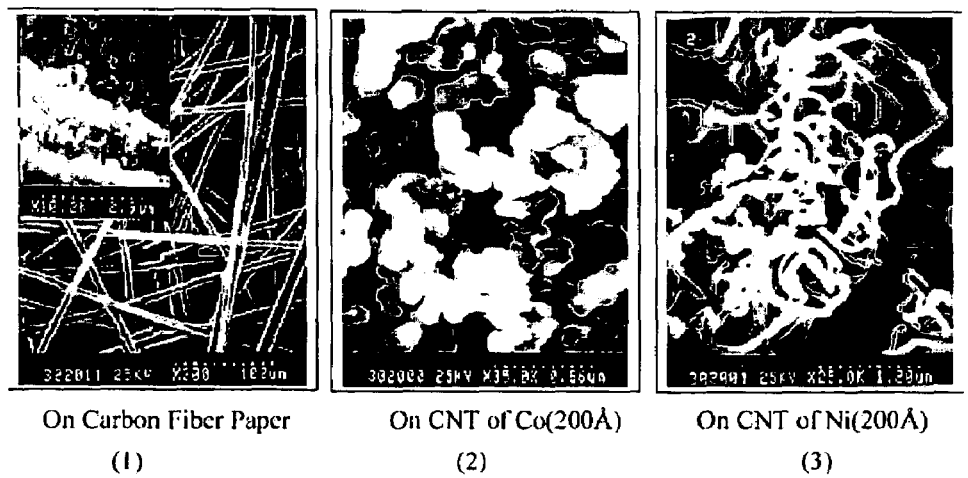
FIG. 11 shows SEM photographs of three samples: (1) $Pt_{0.12}Co_{0.88}$ thin film catalyst directly coated on carbon fiber paper, (2) $Pt_{0.12}Co_{0.88}$ thin film catalyst coated on carbon nanotubes which is directly grown on carbon fiber paper with 200 Å Co catalyst, and (3) $Pt_{0.12}Co_{0.88}$ thin film catalyst coated on carbon nanotubes which are directly grown on carbon fiber paper with 200 Å Ni catalyst.

Such an integrated microdiffusion layer and catalyst/carbon layer can be readily fabricated. For example, carbon nanotubes (CNT) can be directly grown on carbon fibers on the surface layer (1-5 fiber diameter) carbon fiber sheet (see, e.g., FIG. 10). The bare carbon fiber diameter is about 10 μm (see, e.g., FIG. 11, panel 1) and the CNT covered carbon diameter is about 50 μm (see, e.g., FIG. 13, panel B). The large pores of the gas diffusion electrode are thus converted into small pores and the CNT covered top carbon fiber layer can act as a microdiffusion layer enhancing the dispersion of gas (e.g. hydrogen) to the catalyst. The platinum or alloy thin film coating on top of the carbon nanotubes acts as an efficient catalyst structure with large surface area.

Figure 12:
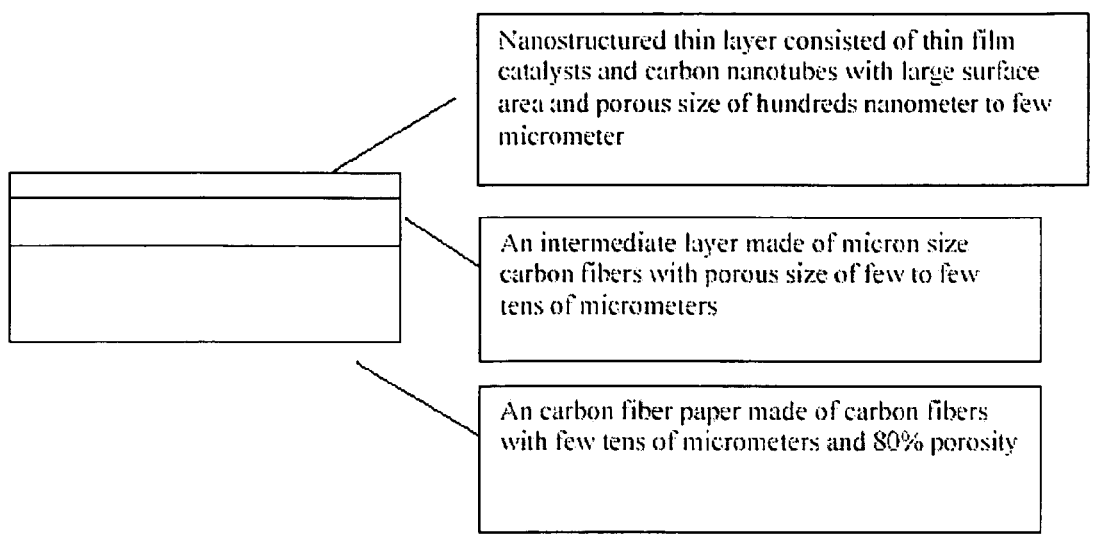
FIG. 12 illustrates a structure of three-layer electrical conducting materials with optimized porosity and thickness for each layer FIG. 13, panels A through F, show SEM photographs of carbon nanotubes directly grown on carbon fibers of Toray Carbon Paper and thin films on carbon nanotubes. Panel A: An SEM photograph at 45× magnification of a sample of Pt thin film (250 A) ion-beam sputtered on carbon nanotubes which were directly grown on a carbon fiber paper substrate by chemical vapor deposition with Ni as catalyst. The white area on the left corner shows the Pt coating. PanelB: An SEM photograph at 300× magnification of a sample of Pt thin film (250 Å) ionbeam sputtered on carbon nanotubes which were directly grown on a carbon fiber paper substrate by chemical vapor deposition with Ni as catalyst. It shows that carbon nanotubes were uniformly covered on each individual carbon fiber of the top layer of Toray carbon paper and diameter of bare carbon fiber increases from ~10 μm to ~30-40 μm as CNT coated fiber, indicating the thickness of CNT layer on carbon fiber is about 10 μm. Panel C: An SEM photograph at 3000× magnification of a sample of Pt thin film (250 Å) ion-beam sputtered on carbon nanotubes which were directly grown on a carbon fiber paper substrate by chemical vapor deposition with Ni as catalyst. It shows uniform carbon nanotube networks on carbon fiber. Panel D: An SEM photograph at 20,000× magnification of a sample of Pt thin film (250 Å) ion-beam sputtered on carbon nanotubes which were directly grown on a carbon fiber paper substrate by chemical vapor deposition with Ni as catalyst. It shows uniform carbon nanotube networks on carbon fiber. Panel E: An SEM photograph at 100,000× magnification of a sample of Pt thin film (250 Å) ion-beam sputtered on carbon nanotubes which were directly grown on a carbon fiber paper substrate by chemical vapor deposition with Ni as catalyst. It shows uniform size of carbon nanotubes in order of 100 nm. Panel F: An SEM photograph at 200,000× magnification of a sample of Pt thin film (250 Å) ion-beam sputtered on carbon nanotubes which were directly grown on a carbon fiber paper substrate by chemical vapor deposition with Ni as catalyst. It shows continuous Pt thin film coating on individual carbon nanotubes.

In an alternative approach nanoparticles (e.g. CNTs, CNHs, or other nanopowders) can be sprayed, on carbon fiber sheet (or other gas diffusion electrodes) and the thin film is then coated on the nanoparticle layer. An intermediate microdiffusion layer can, optionally, be used between the nanoparticle/catalyst layer and carbon fiber sheet (gas diffusion electrode), e.g. as shown in FIG. 12.

In certain embodiments, fibers or whiskers made of carbon, and/or other electrical conducting materials, are grown up on porous electrical conducting substrates. They can be used as a support for the catalytic thin film. In one preferred approach carbon nanotubes are directly grown on a commercial carbon fiber paper; then a thin layer of catalyst of, e.g., Pt, Ni, Co, Fe and their alloys are deposited by chemical vapor deposition on the carbon nanotubes as shown schematically in FIG. 1. Carbon nanotubes or other similar electrical conducting nanostructured materials can also be sprayed or brushed on carbon fiber paper (gas diffusion) electrodes. Platinum alloy thin film catalysts can then be deposited on these carbon nanotube layers which directly contact a proton exchange membrane (PEM).

In certain embodiments, carbon nanotubes or other similar electrical conducting nanostructured materials can also be prepared as a thin sheet with an optimized porosity and preferred thickness e.g., of a few nanometers to tens of micrometers. The thin sheet is then placed or pressed on carbon fiber paper. The thin film catalysts can then be deposited on the carbon nanotube sheet which directly contacts the proton exchange membrane.

In certain preferred embodiments, each carbon nanoparticles (e.g. carbon nanotube) is coated with the thin film catalysts first. For example electroplating can be used to fabricate such catalyst-coated carbon nanotubes or other similar electrical conducting nanostructured materials. Then these catalyst-coated electrical conducting nanostructured materials can then be sprayed, brushed or painted on the carbon paper electrodes or on fuel cell membrane layer. Alternatively these catalystcoated electrical conducting nanostructured materials can also be prepared as a thin sheet with an optimized porosity and preferred thickness of few to tens of micrometers. Such sheet will then placed or pressed on carbon fiber paper.

Figure 14:
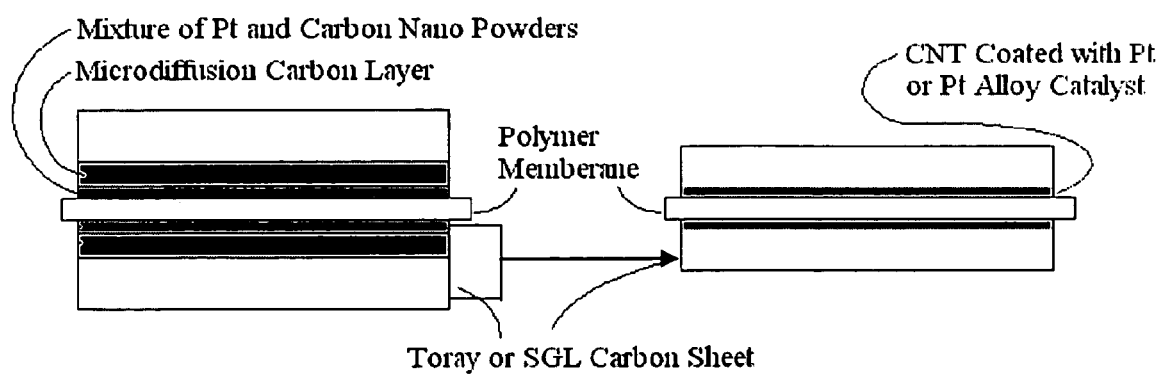
FIG. 14 illustrates an advantage of the fuel catalysts and nanoparticles of this invention. In certain embodiments, the fuel cell catalysts can be incorporated into the porous electrodes (illustrated by embodiment B) thereby eliminating the separate catalyst layers and microdiffusion layers present in a more traditional configuration (illustrated by embodiment A).

In general, one preferred structure of three-layer electrical conducting materials with optimized porosity and thickness for each layer is the most efficient and economic for fuel cell operation as shown in FIGS. 12 and 14. For example, the top layer is made of catalytic thin film catalystcoated carbon nanotubes having diameters from a few nanometers to 100 nanometers with, e.g., high aspect ratios to provide as large surface as possible for catalysis and a uniform micro or nano porous distributed layer. The thickness of this layer can be precisely controlled (e.g., to a few tens of nanotube layers since these are expensive materials).). In certain embodiments, the intermediate layer is made of carbon fibers or powders with a fiber or a carbon sphere diameter of submicrometer to a few micrometers and a layer thickness about ten to a few tens of micrometers. The commercial Toray carbon fiber paper with a fiber diameter ranging from a few to a few tens of micrometers, and a paper thickness of few hundreds of micrometers is well suited for this application. Such structure will have pore size and density gradually changing from bottom layer to the top layer.

Materials for use as proton exchange membranes (PEMs) are well known to those of skill in the art. Suitable proton exchange membrane materials include, but are not limited to Nafion, silicon oxide Nafion composite (see, e.g., Adjemian et al. (2002) *J. Electrochem. Soc.,* 149(3): A256-A261), polyphosphazenes (a hybrid inorganic/organic polymer with a —P=N— backbone) for high temperature PEMFCs (see, e.g., Fedkin et al. (2002) *Materials Letters,* 52: 192-196; Chalkova et al. (2002) *Electrochemical and Solid State Letters,* 10: 221-223), metal foams (see, e.g., (2002) *Fuel Cell Technology News,* 4(9)), sulfonated poly(2,6-dimethyl-1,4-phenylene oxide) (PPO), polystyrene-block-poly(ethylene-ran-butylene)-block</I>-polystyrene, poly[(vinyl chloride-co-(1-methyl-4-vinylpiperazine, poly(2-vinylpyridine-co-styrene), silica-polymer composite proton exchange membrane, and the like.

V. Fuel Cells/Fuel Cell Applications.

The membrane electrode combinations (membrane electrode assemblies) of this invention can be stacked (assembled) to increase the voltage and hence, the power output and thereby form fuel cells capable of delivering the desired level of power for the particular application(s) for which the fuel cell is intended. Within the stack, adjacent single cells (membrane electrode assemblies) are typically electrically connected by means of bipolar plates (BPP) positioned between the surfaces of the electrodes opposite to those contacted with the electrolyte membrane. These BPPs are typically impermeable for the reactants to prevent their permeation to the opposite electrode, mixing and uncontrolled chemical reaction. With respect to this function, the BPP is often referred to as separator. BPPs or separators are often made of metals, particulate carbon and graphite materials, impregnated graphite or also by moulding compounds consisting of graphite and a polymer binder (see, e.g., U.S. Pat. No. 4,214,969). Flow channels or grooves on the surfaces of the BPP provide access for the fuel to the adjacent anode and for the oxidant to the adjacent cathode and removal of the reaction products and the unreacted remnants of fuel and oxidant. These flow channels reduce the useful surface of the BPP, as the electrical contact area is limited to the part of the surface between the channels.

The electrodes typically comprise a porous structure referred to as gas diffusion layer (GDL). The GDL(s) provide an efficient entry passage for both fuel and oxidant, respectively, to the catalyst layer as well as an exit for the reaction products away from the catalyst layer into the flow channel of the adjacent BPP. To facilitate the mass transfer between the flow channels and the GDL pores, the GDL surface area exposed to the channels is typically as large as possible. It is preferred, therefore, that a large portion of the BPP surface is consumed by the flow channels with only a small portion remaining for the electrical contact. Reduction of the electrical contact area is limited, however, by the high contact resistance between BPP and GDL. The contact area between these two is desirably sufficiently large to avoid local overheating at high current densities which would finally lead to destruction of the assembly.

Several suggestions have been made to improve the electronic contact between BPP and GDL and are known to those of skill in the art. Suitable approaches are described, for example, in U.S. Pat. Nos. 4,956,131, and 6,706,437, and in European Patents EP-A 0 955 686, EP-A 0 949 704, EP-A 0 975 040, EP-A 0 933 825, EP-A 1 030 393, and the like.

Fuel cells fabricated according to this invention are can be a suitable energy source for virtually any application. Such applications include, but are not limited to electric vehicles, computers, cell phones, and other electronic devices, home electrical power generation systems, and the like. Fuel cells are particularly desirable since they have been shown to exhibit high energy conversion efficiency, high power density and negligible pollution. In a vehicle such as an automobile, one convenient source of hydrogen gas can be the steam reformation of methanol, since methanol can be stored more easily in a vehicle than hydrogen.

The methods, devices, and applications described herein are intended to be illustrative and not limiting. Using the teachings provided herein, other fabrication methods and the like will be routinely practiced by those of skill in the art.

EXAMPLES

The following examples are offered to illustrate, but not to limit the claimed invention.

Example 1

Pt alloy thin film catalysts were processed through multiplayer depositions and post diffusion annealing. For alloy films with a fixed composition the thickness ratio calculated from atomic weight of the selected elements will be used to control a desired composition. For alloy films with continuously changed composition, the thickness gradient profiles were generated during the deposition process. The ion beam sputtering depositions were carried out under a typical condition of $10^{-4}$ torr and room temperature with pure metal targets. Typical total thickness of multilayers is about 100 Å. Post annealing for inter-diffusion were carried out at 700° C. for 12 hours under $10^{-8}$ torr vacuum. The commercial carbon fiber papers were used as substrates for most of the composition studies.

The carbon nanotubes deposited on the carbon fiber papers were used for enhancing the catalyst surface area and providing a micro gas-diffusion structure. The growth procedures for carbon nanotubes on carbon fiber of Toray carbon paper were:

(1) Depositing 200 Å thick Ni on carbon fiber paper as catalysts;

(2) Putting carbon fiber paper into tube-furnace (6' long and 2" diameter) which connected with Ar, $H_2$ and $C_2H_4$ gas lines;

(3) Flowing Ar in 100 ml/min rate to push air away for 30 minutes;

(4) Flowing a mixture of Ar (50 ml/min) and H2 (10 ml/min) into tube furnace and starting rising temperature to 700° C. in 20° C./min rate;

(5) At 700° C., changing a mixture of gas flow to Ar(15 ml/min), H2(15 ml/min) and C2H4(50 ml/min) into tube for 10 minutes; and (6) Cooling down temperature to 20° C. at 20° C./min rate.

The procedures to spray nanotubes on carbon are:

Nanotubes were ground in an agate ball miller with ethanol. The produced suspension was smeared or sprayed on the Toray carbon paper. Pt was Ion-Beam deposited on the top surface of the smeared nanotubes. The measured catalytic effectiveness reached the level of that on grown nanotubes.

The procedures to make fuel cells were:

(1) Dropping nafion solution (5 mol %) on the catalyst coated carbon paper or carbon nanotubes/carbon paper and drying it in air.

(2) Cutting a piece of ElectroChem's carbon electrode covered with Pt/Ru carbon ink as catalyst (Pt:Ru=2:1, Pt=1 mg/cm$^2$) in same size of the catalyst samples.

(3) Putting the standard electrode, membrane and the catalyst sample as a sandwich structure on the hot pressing machine. Pressing them in 1 ton pressure at 80° C. for 10 minutes to form a fuel cell membrane assembly.

All fuel cell tests were under the conditions of $O_2$ flow at 100 ml/min rate on anode side chamber and H2 flow at 100 ml/min rate on cathode side chamber. All system was sealed from air and kept in 80° C. A series of resistance (1~4700 Ohm) were used for adjust the loading of fuel cell. Keithley multimeter was used to monitor the output voltage and current of testing fuel cells.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of preparing a fuel cell element, said method comprising:

providing a plurality of fibers and/or a porous electrode material;

depositing a nanoparticle catalyst on said plurality of fibers and/or porous electrode material;

forming nanoparticles on said plurality of fibers and/or porous electrode material using said nanoparticles catalyst;

forming a catalytically active layer comprising a substantially continuous thin film on said nanoparticles thereby forming a fuel cell element comprising a plurality of fibers bearing nanoparticles partially or fully coated with a catalytically active thin film;

wherein said thin film comprises an alloy having the formula:

$$Pt_xV_yCo_zNi_w$$

wherein:

x is greater than 0.06 and less than 1;

y, z, and w are independently greater than zero and less than 1; and x+y+z+w=1.

2. The method of claim 1, wherein said plurality of fibers comprises a plurality of carbon fibers.

3. The method of claim 2, wherein said plurality of carbon fibers comprise a porous electrode.

4. The method of claim 2 wherein said plurality of fibers comprise a carbon fiber paper.

5. The method of claim 1, wherein said nanoparticle catalyst is a carbon nanotube catalyst and said nanoparticles are carbon nanotubes.

6. The method of claim 5, wherein said nanoparticles are formed by chemical vapor deposition (CVD) or said depositing a nanoparticle catalyst comprises depositing said catalyst on said fibers by chemical vapor deposition (CVD).

7. The method of claim 5, wherein said nanotubes have a length less than 50 μm and a width less than 100 nm.

8. The method of claim 5, wherein said nanotubes have a diameter of 50 nm to 100 nm.

9. The method of claim 1, wherein said thin film partially covers the nanoparticles.

10. The method of claim 1, wherein the nanoparticles are fully coated with said thin film.

11. The method of claim 1, wherein said thin film ranges in thickness from 1 to 1000 angstroms.

12. The method of claim 10, wherein said thin film ranges in thickness from 5 to 500 angstroms.

13. The method of claim 10, wherein said thin film ranges in thickness from 5 to 100 angstroms.

14. The method of claim 1, wherein platinum comprises from 6% up to 50% (mole ratio or atomic percentage) of said alloy.

15. The method of claim 14, wherein platinum comprises up to 12% (mole ratio or atomic percentage) of said alloy.

16. The method of claim 13, wherein said alloy contains platinum, vanadium, nickel, and copper.

17. The method of claim 1, wherein x is 0.12.

18. The method of claim 1, wherein x is 0.12, y is 0.07, z is 0.56, and w is 0.25.

19. The method of claim 1, wherein:

said providing a plurality of fibers and/or a porous electrode material comprises providing a carbon fiber paper;

said depositing a nanoparticle catalyst comprises depositing said catalyst by chemical vapor deposition;

said forming nanoparticles comprises forming carbon nanotubes; and said forming a catalytically active layer comprising depositing a substantially continuous thin film comprising platinum or a platinum alloy.

* * * * *